US008209746B2

(12) United States Patent
Tamai et al.

(10) Patent No.: US 8,209,746 B2
(45) Date of Patent: Jun. 26, 2012

(54) CONTENT PRESENTATION-TYPE AUTHENTICATION SYSTEM

(75) Inventors: Shigetomo Tamai, Tokyo (JP); Toru Takano, Tokyo (JP); Shigeo Akutsu, Tokyo (JP)

(73) Assignee: Computer Systems Engineering Co., Ltd., Tokyo (JP)

( * ) Notice: Subject to any disclaimer, the term of this patent is extended or adjusted under 35 U.S.C. 154(b) by 0 days.

(21) Appl. No.: 12/982,263

(22) Filed: Dec. 30, 2010

(65) Prior Publication Data

US 2011/0202981 A1     Aug. 18, 2011

Related U.S. Application Data

(63) Continuation of application No. PCT/JP2010/052185, filed on Feb. 15, 2010.

(51) Int. Cl.
H04L 29/06     (2006.01)

(52) U.S. Cl. ......................................................... 726/6

(58) Field of Classification Search ...................... 726/6
See application file for complete search history.

(56) References Cited

U.S. PATENT DOCUMENTS

| | | | |
|---|---|---|---|
| 7,409,705 B2 * | 8/2008 | Ueda et al. | 726/5 |
| 7,945,948 B2 * | 5/2011 | Ueda et al. | 726/5 |
| 7,984,491 B2 * | 7/2011 | Ueda et al. | 726/6 |
| 2005/0160297 A1 * | 7/2005 | Ogawa | 713/202 |
| 2007/0113294 A1 * | 5/2007 | Field et al. | 726/27 |
| 2007/0226784 A1 * | 9/2007 | Ueda et al. | 726/5 |
| 2007/0234063 A1 * | 10/2007 | Ueda et al. | 713/183 |
| 2010/0043063 A1 * | 2/2010 | Ueda et al. | 726/6 |

FOREIGN PATENT DOCUMENTS

| | | |
|---|---|---|
| JP | 2001-265810 A | 9/2001 |
| JP | 2001-306520 A | 11/2001 |
| JP | 2004-227108 A | 8/2004 |
| JP | 2007-178625 A | 7/2007 |
| JP | 2007-272364 A | 10/2007 |
| JP | 3996939 B2 | 10/2007 |
| WO | WO 03/069490 A1 | 8/2003 |

OTHER PUBLICATIONS

Written Opinion of the International Searching Authority for International Application No. PCT/JP2010/052185, dated Sep. 28, 2010, 3 pages.

* cited by examiner

Primary Examiner — David García Cervetti
(74) Attorney, Agent, or Firm — Brinks Hofer Gilson & Lione

(57) ABSTRACT

It is intended to achieve a user authentication system capable of forcibly presenting a content to a user. Provided is a content presentation-type authentication system designed to allow a client to perform a content presentation-type user authentication in which user authentication is performed in such a manner that a plurality of pattern elements arranged in a given pattern are presented as a presentation pattern to a user who intends to be authenticated, and a one-time password derivation rule is used as a password of the user and applied to certain ones of the pattern elements located at specific positions in the presentation pattern to create a one-time password, and a content is forcibly presented to the user in connection with the user authentication. The content presentation-type authentication system comprises an authentication-service providing server configured to manage respective user IDs and passwords of users, content data indicative of a detail of each of a plurality of contents, and respective content IDs of the plurality of contents, and provide content-added authentication information to each of the users, and a client having a content presentation-type user authentication program and a processor.

11 Claims, 22 Drawing Sheets

FIG.6

USER INFORMATION TABLE

| USER ID |
|---|
| USER ATTRIBUTE INFORMATION<br>・AGE<br>・GENDER<br>・REGISTRATION DATE |

FIG.7

PASSWORD TABLE

| USER ID |
|---|
| ONE-TIME PASSWORD DERIVATION RULE |

FIG.9

CONTENT INFORMATION TABLE

| CONTENT ID |
|---|
| CONTENT OFFERER ID |
| CONTENT DATA |
| CONTENT-PRESENTATION TARGET USER CONDITION<br>　　・TARGET GENDER<br>　　・TARGET AGE |

FIG.11

CONTENT-ADDED AUTHENTICATION INFORMATION TABLE

| |
|---|
| USER ID |
| AUTHENTICATION INFORMATION (1)<br>・PATTERN-SPECIFYING INFORMATION (1)<br>・VERIFICATION CODE (1) |
| ≀ |
| AUTHENTICATION INFORMATION (P)<br>・PATTERN-SPECIFYING INFORMATION (P)<br>・VERIFICATION CODE (P) |
| CONTENT DATA (1) |
| ≀ |
| CONTENT DATA (Q) |

(CONTENT-ADDED-AUTHENTICATION-INFORMATION CREATION STAGE)

(CONTENT PRESENTATION-TYPE AUTHENTICATION STAGE)
<CLIENT>

(CONTENT-ADDED AUTHENTICATION INFORMATION RE-ACQUISITION STAGE)

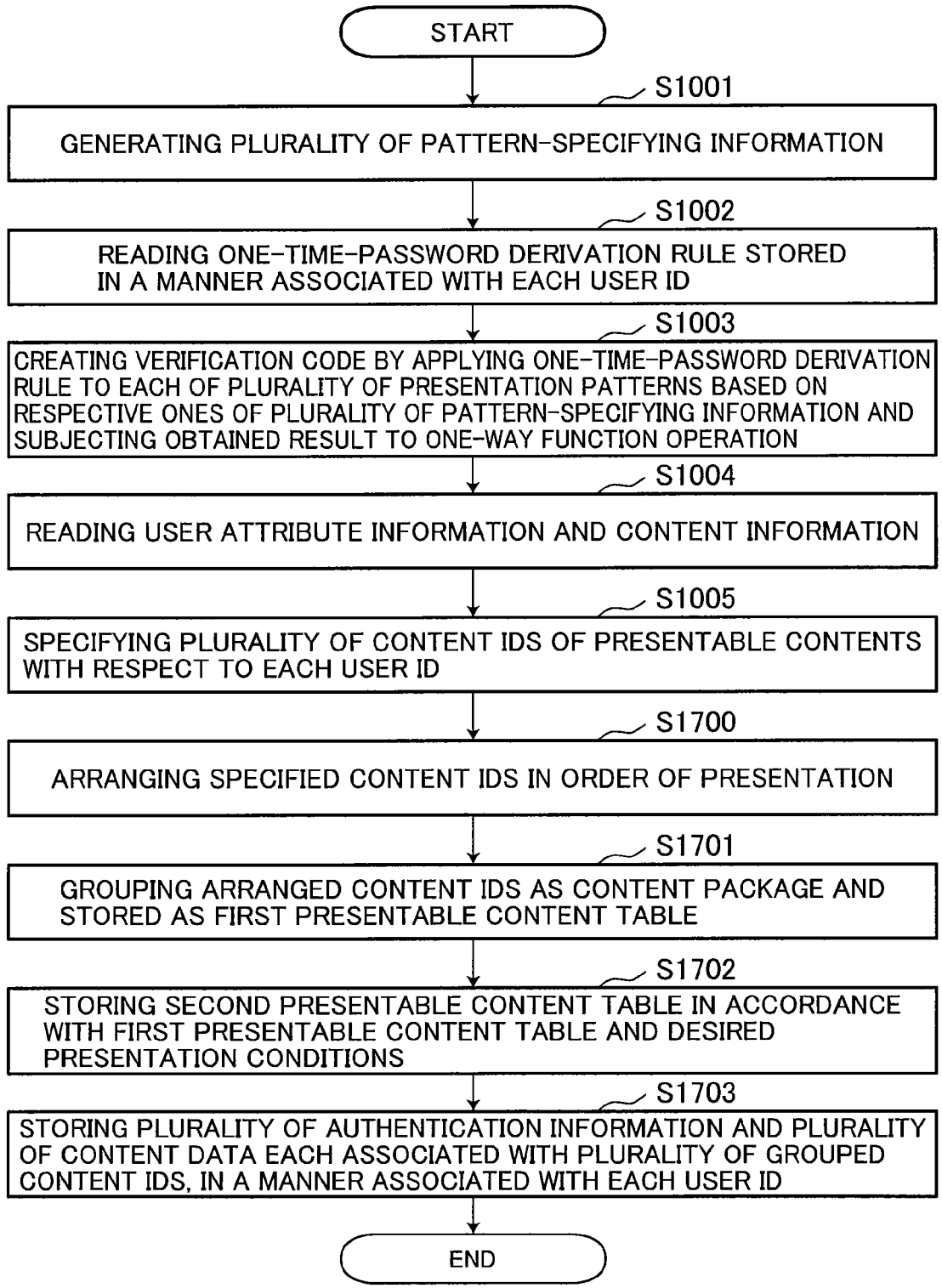

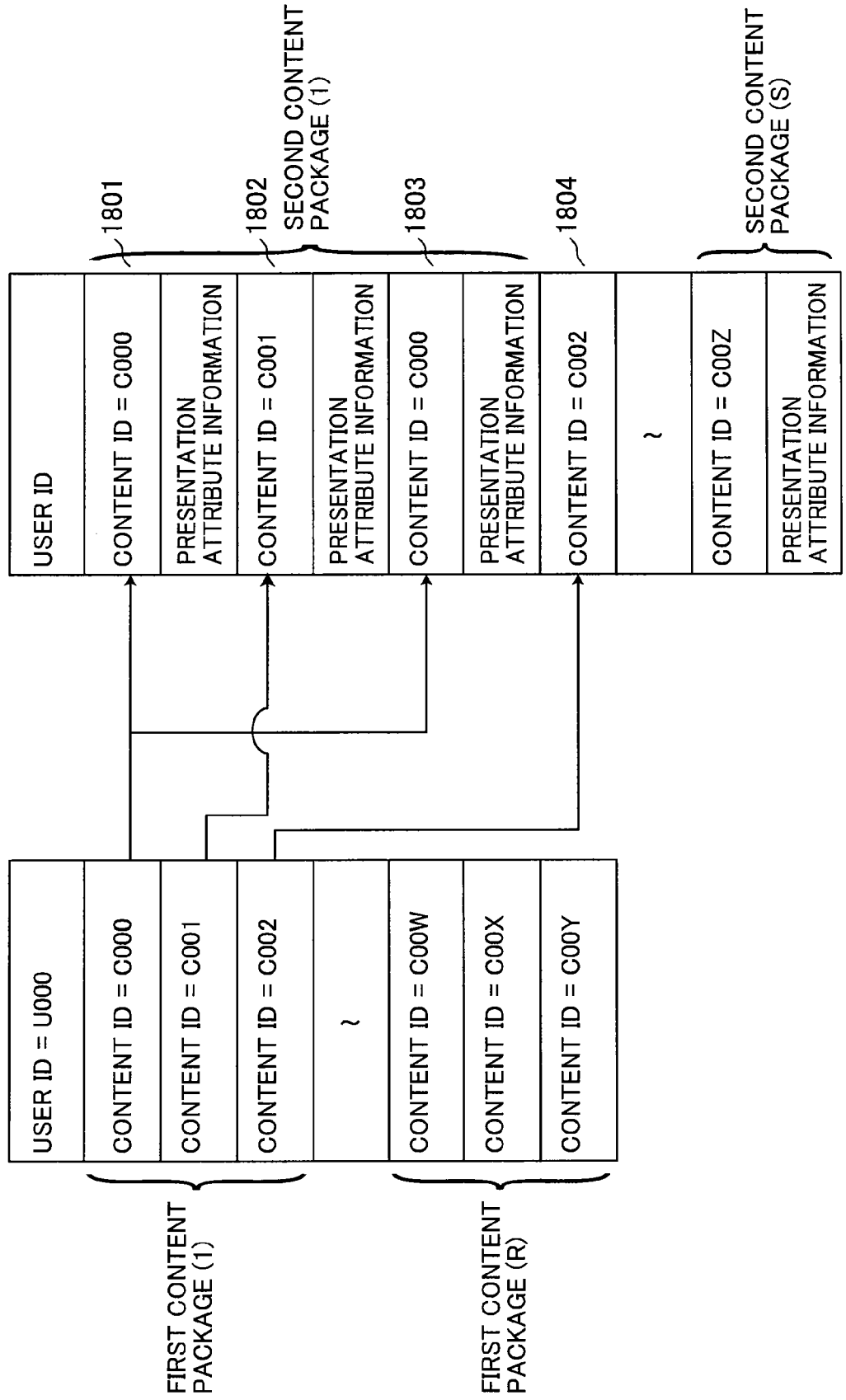

FIG.19

CONTENT-ADDED AUTHENTICATION INFORMATION TABLE

| USER ID |
|---|
| AUTHENTICATION INFORMATION (1)<br>  ·PATTERN-SPECIFYING INFORMATION (1)<br>  ·VERIFICATION CODE (1) |
| CONTENT DATA (1-1) |
| CONTENT-PRESENTATION ATTRIBUTE INFORMATION (1-1) |
| CONTENT DATA (1-2) |
| CONTENT-PRESENTATION ATTRIBUTE INFORMATION (1-2) |
| CONTENT DATA (1-3) |
| CONTENT-PRESENTATION ATTRIBUTE INFORMATION (1-3) |
| ⁓ |
| AUTHENTICATION INFORMATION (S)<br>  ·PATTERN-SPECIFYING INFORMATION (S)<br>  ·VERIFICATION CODE (S) |
| CONTENT DATA (S-1) |
| CONTENT-PRESENTATION ATTRIBUTE INFORMATION (S-1) |

CONTENT-ADDED AUTHENTICATION INFORMATION PACKAGE (1) { AUTHENTICATION INFORMATION (1) through CONTENT-PRESENTATION ATTRIBUTE INFORMATION (1-3)

CONTENT-ADDED AUTHENTICATION INFORMATION PACKAGE (S) { AUTHENTICATION INFORMATION (S) through CONTENT-PRESENTATION ATTRIBUTE INFORMATION (S-1)

(CONTENT PRESENTATION-TYPE AUTHENTICATION STAGE)

CONTENT PRESENTATION-TYPE AUTHENTICATION SYSTEM

RELATED APPLICATIONS

This application is a continuation of PCT/JP2010/052185 filed on Feb. 15, 2010, the entire content of which is incorporated herein by reference.

TECHNICAL FIELD

The present invention relates to a user authentication system, and more specifically to a content presentation-type authentication system designed to perform user authentication in such a manner that a plurality of pattern elements arranged in a given pattern format are presented as a presentation pattern to a user who intends to be authenticated, and a one-time-password derivation rule is applied to the presentation pattern to create a one-time password, and forcibly present a content to the user in connection with the user authentication.

BACKGROUND ART

Recently, in the field of user authentication systems, a user authentication system based on a so-called matrix authentication scheme has been developed as one type of challenge/response scheme (see, for example, the following Patent Document 1). In the matrix authentication, a matrix-like presentation pattern having random numbers arranged in a given pattern format is presented to a user who intends to be authenticated, and a one-time-password derivation rule is used as a password of the user and applied to certain ones of a plurality of pattern elements (the respective random numbers) comprised in the presentation pattern, to create a one-time password. Further, the same presentation pattern is shared between a server and a client, and the one-time password created as a result of applying the one-time-password derivation rule serving as the user's password to the presentation pattern in the client is compared with a verification code created as a result of applying the one-time-password derivation rule serving as the user's password to the presentation pattern in the server. In this manner, user authentication is performed without directly comparing between the passwords. In the matrix authentication, a one-time-password derivation rule serving as a password consists of positions of two or more elements to be selected on a matrix, and an order of the selection, and has a feature that a user can easily remember it as an image, and it cannot be figured out even if a one-time password is subjected to a furtive glance during an operation of entering the one-time password.

An off-line user authentication system has also been developed which is designed to allow a matrix authentication even when a client is not connected to a server via a network, i.e., in an off-line state (see the following Patent Document 2). An off-line authentication system employing a matrix authentication is designed to store, in an off-line authentication client, a plurality of pattern element sequences each constituting a presentation pattern, and a plurality of verification codes each created by applying a one-time-password derivation rule to a respective one of the presentation patterns and then subjecting the obtained result to a one-way function operation using a hash function, and perform authentication in such a manner that one of the stored pattern element sequences is selected to generate a presentation pattern, and a code created by subjecting an entered one-time password to the one-way function operation is compared with a corresponding one of the verification codes. Thus, the off-line authentication client can display or present a presentation pattern by itself. In addition, the verification codes for verifying passwords are stored in a hashed form, without storing passwords themselves. This makes it possible to achieve an off-line matrix authentication having high security capable of preventing password leakage even if a client is analyzed.

FIG. 21 is a functional block diagram of an off-line user authentication system 2100 designed to allow a conventional matrix authentication. In this system, a user ID 2181 is entered by a user of a client 2151 through a user-ID input unit 2152, and transmitted to an authentication support server 2101 through a verification-data requestor 2153. In the authentication support server 2101, the entered user ID 2181 is received through a verification-data-request receiver 2103. Then, a pattern generator 2104 is operable to generate a plurality of pattern element sequences 2190 which are information for creating respective ones of a plurality of presentation patterns 2210 (FIG. 22) corresponding to the entered user ID, and a verification-code creator 2106 is operable to create a plurality of verification codes 2193 which correspond to respective ones of the presentation patterns and a one-time-password derivation rule 2102$b$ corresponding to a user ID 2102$a$ stored in a password storage 2102. The pattern element sequences 2190 and the verification codes 2193 are preliminarily transmitted to the client 2151 through a patter transmitter 2105 and a verification-code transmitter 2111, respectively. In the client 2151, the pattern element sequences 2190 and the verification codes 2193 are received through a pattern receiver 2154 and a verification-code receiver 2162, respectively, and stored in verification-data storage 2161. Then, a pattern selector 2163 is operable, in response to an entry of the user ID by the user through the user-ID input unit 2153, to select one of the pattern element sequences 2190 stored in the verification-data storage 2161. A pattern display unit 2155 is operable, based on the selected pattern element sequence 2190, to display a presentation pattern 2210 in the client 2151, and a one-time-password input unit 2156 is operable to accept an entry of a cone-time password from the user. A verification-code determiner 2164 is operable to determine one of the verification codes 2193 which corresponds to the user ID and the selected pattern element sequence and read the determined verification code 2193 from the verification-data storage 2161, and a user authentication unit 2165 is operable to compare a code created by subjecting the entered one-time password to a one-way function operation with the verification code 2193 to perform a user verification.

FIG. 22 is a conceptual diagram showing a process of creating a presentation pattern 2210 in a conventional matrix authentication system. FIG. 22 illustrates a pattern element sequence 2190 comprising a plurality of pattern elements which are one-digit numerals of 0 to 9, and a presentation pattern 2210, wherein the pattern elements comprised in the pattern element sequence are arranged at respective positions in a pattern format consisting of four 4×4 matrixes. In this example, the authentication support server 2101 is operable to generate sixty four one-digit numerals as the pattern elements to be comprised in the presentation pattern 2210, by a random-number generation algorithm, and then transmit a pattern element sequence 2190 created by sequencing the generated numerals, to the client 2151. The client 2151 is operable to, after receiving the pattern element sequence 2190 from the authentication support server 2101, sequentially arrange the pattern elements comprised therein, at respective positions in a given pattern format (in this example, four 4×4 matrixes), so as to create the presentation pattern 2210, and display the created presentation pattern 2210 on a display screen.

FIG. 23 is a conceptual diagram showing a process of entering a one-time password in the matrix authentication scheme. The user sequentially extracts certain ones of the numerals displayed at given positions on the matrix, by applying the one-time-password derivation rule to the presentation pattern 2210, and enters the extracted numerals from the one-time-password input unit 2156. The arrows and circles indicated by broken lines in FIG. 23 denote that the one-time password based on the presentation pattern 2210 is entered from a keyboard 2300.

PATENT DOCUMENTS

[Patent Document 1] Pamphlet of WO 03/069490 A (lines 2 to 14, page 10)
[Patent Document 2] JP 3996939 B As a condition for using a new authentication system such as the above off-line user authentication system designed to allow a matrix authentication, a user is generally required to purchase a license for a program for the new authentication system or pay a usage fee for the system. If the new authentication system involves a program licensing fee or a system usage fee although it provides higher security, a user is highly likely to continue the use of an existing user authentication system capable of ensuring a certain level of security. Therefore, even if the new authentication system has high security, it will be used by only some users active in enhancing security, and it is difficult to widely expand use thereof. Thus, there is a problem that a developer of the new user authentication system cannot sufficiently recover a development cost and a maintenance cost.

SUMMARY OF THE INVENTION

The present invention has been made in view of the above problem, and has the following features. The present invention provides a content presentation-type authentication system designed to allow a client to perform a content presentation-type user authentication in which user authentication is performed in such a manner that a plurality of pattern elements arranged in a given pattern are presented as a presentation pattern to a user who intends to be authenticated, and a one-time password derivation rule is used as a password of the user and applied to certain ones of the pattern elements located at specific positions in the presentation pattern to create a one-time password, and a content is forcibly presented to the user in connection with the user authentication. The content presentation-type authentication system comprises: an authentication-service providing server configured to manage respective user IDs and passwords of users, content data indicative of a detail of each of a plurality of contents to be forcibly presented in connection with a plurality of the user authentications, and respective content IDs of the plurality of contents, and provide content-added authentication information to each of the users; and a client equipped with a content presentation-type user authentication program and a processor which are operable to perform the content presentation-type user authentication, and connected to the authentication-service providing server via a network, wherein the authentication-service providing server includes: user-information storage which pre-stores therein the user ID of each of the users, and user attribute information indicative of an attribute of the user, in a mutually associated manner; password storage which pre-stores therein the user ID of each of the users, and a one-time-password derivation rule of the user, in a mutually associated manner; a pattern-specifying-information generator operable, in accordance with a given generation rule, to generate a plurality of pattern-specifying information each adapted to specify the presentation pattern; a verification-code creator operable to create a verification code by applying the one-time-password derivation rule associated with each of the user IDs to the presentation pattern specified based on each of the plurality of pattern-specifying information generated by the pattern-specifying-information generator, and then subjecting the obtained result to a one-way function operation; content-information storage operable, with respect to each of the contents to be forcibly presented in connection with the user authentication, to store therein the content ID of the content, the content data indicative of the detail of the content, and content-related information containing a content-presentation target user condition indicative of a condition for users to be targeted in presentation of the content, in a mutually associated manner; a presentable-content specifying unit operable, with respect to each of the user IDs, to specify a plurality of the content IDs on condition that the user attribute information associated with the user ID satisfies the content-presentation target user condition contained in the content-related information associated with each of the plurality of content IDs; authentication-information storage operable to store therein a plurality of authentication information each containing the verification code created in association with a respective one of the user IDs and the pattern-specifying information used to create the verification code, and a plurality of the content data each pertaining to a respective one of the plurality of content IDs specified with respect to each of the user IDs, in a manner associated with each of the user IDs; an authentication-information-request receiver operable to receive an authentication-information request containing the user ID of the user who intends to be authenticated, from the client via the network; and a content-added-authentication-information transmitter operable to transmit the content-added authentication information which contains the plurality of authentication information and the plurality of content data each stored in a manner associated with the received user ID, and wherein the content presentation-type user authentication program is configured, when it is run on the processor of the client in connection with the user authentication, to achieve: a user-ID input unit operable to accept an entry of the user ID from the user; authentication-information-request a transmitter operable to transmit the authentication-information request containing the entered user ID, to the authentication-service providing server via the network; a content-added-authentication-information receiver operable to receive the content-added authentication information transmitted from the authentication-service providing server in a manner associated with the user ID, via the network; authentication-information storage operable to store therein the received content-added authentication information in a manner associated with the user ID; an authentication-information selector operable to select one of the plurality of authentication information contained in the content-added authentication information associated with the user ID; a pattern-element-sequence creator operable to create a pattern element sequence, based on the pattern-specifying information contained in the selected authentication information; a pattern display unit operable to create a presentation pattern, based on the pattern element sequence, and display the presentation pattern on a screen; a one-time-password input unit operable to accept, from the user, an entry of a one-time password as a result of applying the one-time-password derivation rule to certain ones of the plurality of pattern elements comprised in the presentation pattern; a user authentication unit operable to compare a code created by subjecting the entered one-time password to the one-way function operation, with the verification code contained in the selected authentication information, and, when they are identical to each other, to successfully authenticate the user; a content selector operable, in accordance with a given rule, to select content data about a content to be forcibly presented in connection with the user authentication, from the plurality of content data contained in the content-added authentication information; and a content presentation unit operable, based on the selected content data, to forcibly present the content to the user in connection with the user authentication.

The content presentation-type authentication system of the present invention may be configured such that the content presentation-type authentication in the client is performed in place of user authentication based on an OS's built-in authentication program on the client, by installing the content presentation-type user authentication program onto the client, wherein the processor of the client is adapted to run thereon an installation program for installing the content presentation-type user authentication program onto the client, so as to achieve an installation unit which is operable, in connection with the user authentication in the client, to change an OS setup in such a manner as to start the content presentation-type user authentication program in place of the OS's built-in authentication program.

In the above content presentation-type authentication system may be configured such that the content presentation-type user authentication program is downloaded from the authentication-service providing server to the client, wherein: the authentication-service providing server includes program storage operable to store therein the content presentation-type user authentication program and the installation program, a download-request receiver operable to receive a download request for the content presentation-type user authentication program and the installation program from the client via the network, and a program transmitter operable, when the download-request receiver receives the download request from the client, to transmit the content presentation-type user authentication program and the installation program to the client via the network; and the client includes download-request transmitter operable to transmit the download request for the content presentation-type user authentication program and the installation program to the authentication-service providing server via the network, a program receiver operable to receive the content presentation-type user authentication program and the installation program from the authentication-service providing server, and program storage operable to store therein the received programs.

In the content presentation-type authentication system of the present invention, the content may be an advertisement.

In the content presentation-type authentication system of the present invention, the content-information storage of the authentication-service providing server may be further operable to store therein each of the plurality of content data specified with respect to a respective one of the user IDs, in a manner associated with any one of the plurality of authentication information stored therein in a manner associated with the user ID, and the content selector of the client may be operable to select at least one of the plurality of content data which is associated with the authentication information selected for one of the plurality of user authentications, so as to forcibly present the content of the selected content data in connection with the user authentication.

In the content presentation-type authentication system of the present invention, the content-related information associated with the content ID of each of the contents may contain a desired presentation condition including at least one selected from the group consisting of: a desired presentation frequency representing a desired number of presentations of the content per user authentication; a desired presentation duration representing a desired time-period of presentation of the content per user authentication; and continuous-presentation permissibility information representing whether continuous presentation of the content is permissible, and wherein: the presentable-content specifying unit is operable, based on the desired presentation condition contained in the content-related information associated with the content ID of each of the content, to produce content-presentation attribute information including at least one of a presentation duration per presentation of the content and a continuous presentation information representing whether the content is continuously presented, and store the content data associated with the content ID, in the authentication-information storage in a manner associated with the content-presentation attribute information; the content-added authentication information to be transmitted from the authentication-service providing server to the client is formed to further contain the content-presentation attribute information; and the content presentation unit is operable to forcibly represent the content to the user in connection with the user authentication, according to the content-presentation attribute information.

In the content presentation-type authentication system of the present invention, the authentication-information storage of the client may be adapted to avoid re-selecting an already selected one of the plurality of authentication information contained in the content-added authentication information stored in the authentication-information storage of the client in a manner associated with the user ID of the user who intends to be authenticated, and wherein: the authentication-information-request transmitter of the client is operable, when all of the plurality of authentication information contained in the content-added authentication information stored in the authentication-information storage of the client in a manner associated with the user ID of the user who intends to be authenticated are selected by the authentication-information selector of the client through the user authentications, to transmit a new authentication-information request containing the user ID, via the network; the authentication-information-request receiver of the authentication-service providing server is operable to receive the new authentication-information request from the client via the network; the content-added-authentication-information transmitter of the authentication-service providing server is operable to transmit new content-added authentication information associated with the user ID contained in the received authentication-information request, to the client; the content-added-authentication-information receiver of the client is operable to receive, via the network, the new content-added authentication information associated with the user ID contained in the authentication-information request, and transmitted from the authentication-service providing server; and the authentication-information storage of the client is operable to update the stored content-added authentication information with the received content-added authentication information.

In the content presentation-type authentication system of the present invention, the authentication-service providing server may further include at least one selected from the group consisting of: a user-information updater operable to update the information stored in the user-information storage; a authentication-information updater operable to update the information stored in the authentication-information storage; and a content updater operable to update the information stored in the content-information storage.

In the content presentation-type authentication system of the present invention, the presentable-content specifying unit of the authentication-service providing server may be adapted, at a given timing and with respect to each of the user IDs, to re-specify specify a plurality of the content IDs on condition that the user attribute information associated with the user ID satisfies the content-presentation target user condition contained in the content-related information associated with each of the plurality of content IDs; and the authentication-information storage may be adapted to be updated by storing therein a plurality of the content data pertaining to respective ones of the plurality of content IDs re-specified with respect to each of the user IDs, in a manner associated with the user ID.

In the content presentation-type authentication system of the present invention, the pattern-element-sequence creator may be operable to create the pattern element sequence based on both the pattern-specifying information and the user ID.

In the content presentation-type authentication system of the present invention, the user attribute information may include at least one of age and gender of each of the users.

In the present invention, based on employing the above system configuration, a content such as an advertisement can be forcibly presented to a user, so that it becomes possible to make a content offerer or the like to bear a certain level of monetary burden. This makes it possible to reduce or eliminate user's burden of a program licensing fee or a system usage fee which would otherwise be required for using the user authentication system of the present invention providing matrix authentication as authentication means with high security and convenience, so as to promote spread of the user authentication system of the present invention, while sufficiently recovering a development cost and a maintenance cost for the user authentication system of the present invention.

In the present invention, a content is forcibly presented in connection with user authentication which is a procedure to be inevitably performed by a user during a computer's start-up process, so that it becomes possible to make the user to reliably look at or listen to the content when he/she operates a client for the user authentication. This feature is particularly effective when the content is an advertisement. In addition, the authentication information and the content data in the content-added authentication information to be transmitted to the client can be managed in a mutually associated manner, so that a content to be presented to a user can be easily figured out. This makes it possible to calculate a content providing fee to a content offerer in a clear and easy manner.

BRIEF DESCRIPTION OF THE DRAWINGS

FIG. 6 illustrates a user information table in the first embodiment.

FIG. 7 illustrates a password table in the first embodiment.

FIG. 9 illustrates a content information table in the first embodiment.

FIG. 11 illustrates a content-added authentication information table in the first embodiment.

FIG. 17 is a flowchart showing a content-added-authentication-information creation stage in a content presentation-type authentication in the second embodiment.

FIGS. 18(A) and 18(B) respectively illustrate first and second presentable content tables in the second embodiment.

FIG. 19 illustrates a content-added authentication information table in the second embodiment.

DETAILED DESCRIPTION OF THE PREFERRED EMBODIMENTS

Firstly, the terms used in this specification will be described below.

[Terms: Presentation Pattern and Pattern Element]

The term "presentation pattern" is a pattern formed by arranging a plurality of pattern elements in a given pattern format. While the given pattern format is typically a matrix in which a plurality of matrix elements are arranged at respective ones of m (column)×n (row) positions to form a rectangular shape as a whole, or a plurality of the matrixes arranged in side-by-side relation, it may be any other suitable type. In this specification, an authentication scheme using a presentation pattern arranged in any pattern format other than the typical matrix pattern will also be referred to as "matrix authentication scheme". An orderly pattern or an impressive pattern is suitable as the give pattern format, because it is more likely to remain in user's memory, and thereby allows a user to easily remember a one-time-password derivation rule serving as a password.

The term "pattern element" is an element to be arranged at a given position in the given patter format so as to constitute a presentation pattern. Preferably, the pattern element is selected from one-digit numerals of 0 to 9. Alternatively, the pattern element may be any other suitable character, such as alphabet or symbol. As the symbol, it is particularly preferable to use "+", " ", "*", "=", "_", "!", "?", "#", "$" or "&" which is assigned to a keyboard for a personal computer (PC). The character may be a figure, such as graphic, illustration or photograph. Preferably, in a presentation pattern, the number of each of a plurality of different pattern elements is set to be two or more. In this case, a one-time-password derivation rule serving as a password has many-to-one correspondence with a one-time password as a result of applying the one-time-password derivation rule to a presentation pattern, and thereby one-wayness is automatically achieved during entry of the one-time password. Therefore, even if the presentation pattern can be specified, it is impossible to specify the one-time-password derivation rule based on only one one-time password.

Figure 23:
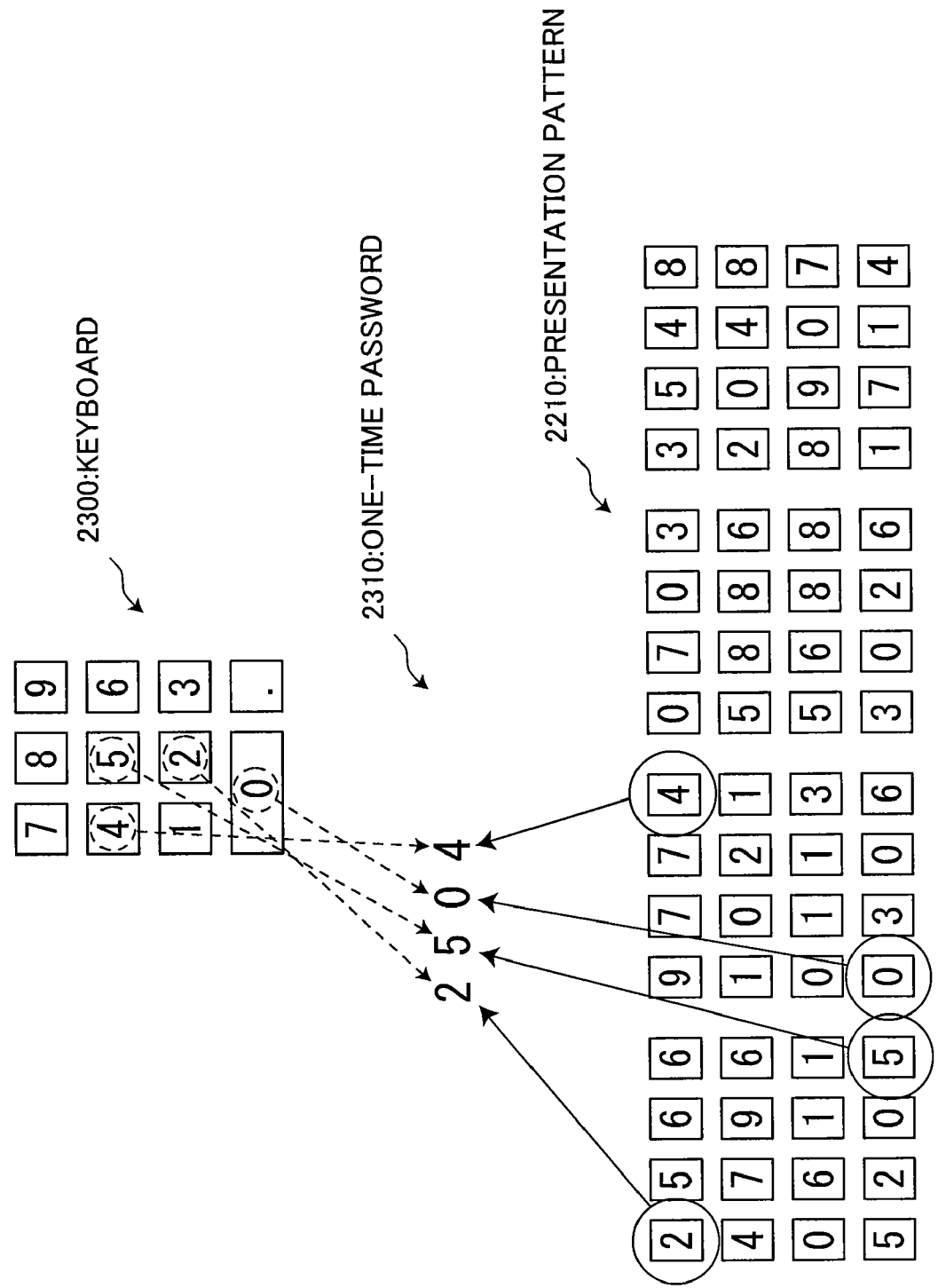
FIG. 23 is a conceptual diagram showing a process of entering a one-time password, in the matrix authentication scheme.

In after-mentioned embodiments, as shown in FIG. 23, one-digit numerals of 0 to 9 are used as pattern elements, and the pattern elements are arranged in a given pattern format consisting of four 4×4 matrixes to form a presentation pattern (2210). In a certain type of client, such as a portable phone, having a display screen with a relatively small area, it is preferable to use a presentation pattern in which the number of the 4×4 matrixes is reduced, for example, to three.

[Term: Pattern-Specifying Information]

Pattern-specifying information is information for specifying a presentation pattern (2210). A typical pattern-specifying information is a pattern element sequence or a pattern seed value.

Figure 22:
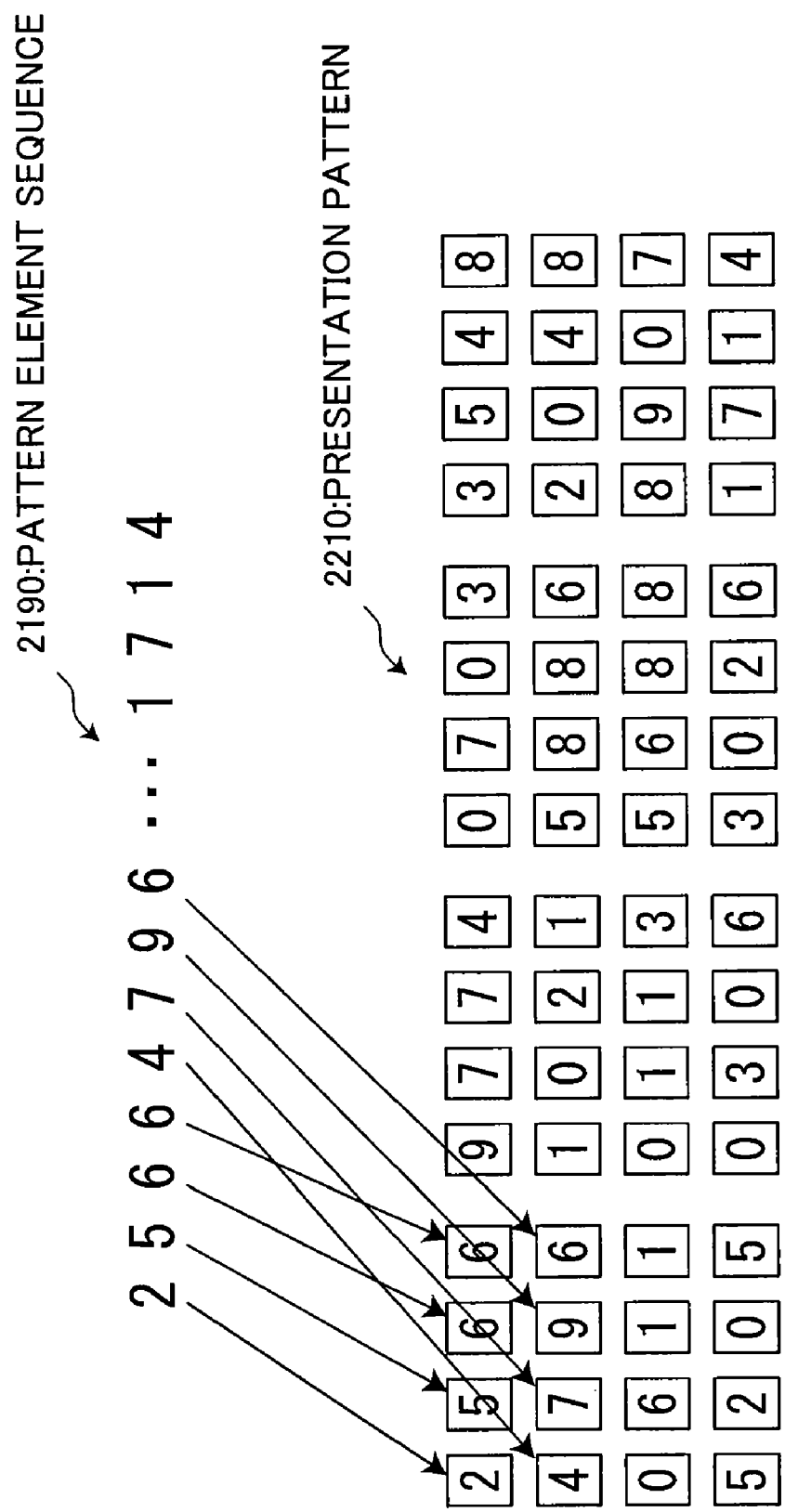
FIG. 22 is a conceptual diagram showing a process of creating a presentation pattern, in the matrix authentication scheme.

The pattern element sequence is a sequence of pattern elements, e.g., the pattern elements consisting of one-digit numerals of 0 to 9, as shown in FIG. 22. In other words, it is data indicative of a detail of a sequence of pattern elements arranged in a given pattern to create a presentation pattern (2210). Typically, the pattern element sequence is formed by arranging, in series, all pattern elements to be comprised in the presentation pattern (2210). It is understood that the pattern element sequence (2190) is not limited to a single character sequence formed by arranging a plurality of pattern elements in series, but it means any data containing information about all pattern elements to be comprised in a single presentation pattern (2210). Thus, as long as a plurality of pattern elements included in the pattern element sequence (2190) are associated with respective positions in a presentation pattern, an order of the pattern elements included in the pattern element sequence (2190) may be freely determined. Further, the pattern element sequence (2190) may be divided into a plurality of data.

The pattern seed value is information for creating a presentation pattern (2210) in accordance with a given rule. As an example of the given rule, it is contemplated to employ a rule that a part of a digit sequence obtained by subjecting the pattern seed value to a hash function operation is used as a pattern element sequence. Based on using the pattern seed value instead of a pattern element sequence itself, security can be enhanced. Typically, the pattern seed value is a numerical value generated by a random-number generation algorithm to fall within a given numerical range. As long as the pattern seed value falls within a given numerical range, it may be generated in accordance with a rule other than the random-number generation algorithm, for example, by count-up or count-down at given numerical intervals from a given initial value. Further, a user ID may be used in combination with the generated random number so as to provide further enhanced security.

[Term: One-Time-Password Derivation Rule]

A one-time-password derivation rule is a rule to be applied to certain ones of a plurality of pattern elements located at specific positions in a presentation pattern (2210) so as to create a one-time password (2310). In other words, it is data serving as a password of a user. Typically, "applying the one-time-password derivation rule to the certain pattern elements" means to select two or more pattern elements located at specific positions in a presentation pattern, in a specific order. In this case, the one-time-password derivation rule is information comprising a combination of positions at which respective pattern elements to be selected are located in a presentation pattern (2210), and a selection order of the pattern elements. The one-time-password derivation rule may further include a fixed password element which is not based on a presentation pattern (2210).

[Term: One-Time Password]

A one-time password (2310) is a single-use password to be created by a user who intends to be authenticated, in such a manner as to apply a one-time-password derivation rule of the user to a presentation pattern (2210), and then entered into a client by the user. FIG. 23 is a conceptual diagram showing a process of entering a one-time password in the matrix authentication scheme. A one-time-password derivation rule used in FIG. 23 is to select four pattern elements located at encircled positions in a presentation pattern, in order from a left side toward a right side of the presentation pattern. In accordance with the above one-time-password derivation rule, the user selects the four pattern elements located at the predefined positions in the presentation pattern (2210), in the pre-defined order, to create "2504" as a one-time password, and enters the one-time password into a client.

[Term: Verification Code]

A verification code is data for verifying legitimacy of an entered one-time password. Specifically, the verification code is a code created by applying a one-time-password derivation rule of a user to each of a plurality of presentation patterns capable of being displayed on a client based on a plurality of pattern elements, and then subjecting the obtained result to a one-way function operation. More specifically, the verification code is a code created by subjecting, to a one-way function operation, a value identical to that of a legitimate one-time password as a result of applying a legitimate one-time-password derivation rule associated with a user who intends to be authenticated, to a legitimate presentation pattern. Thus, the verification code is stored in a client in a manner associated with pattern-specifying information for specifying the presentation pattern used for creating the verification code. During user authentication in the client, a value created by subjecting a one-time password entered into the client based on a presentation pattern presented to the user, to the same one-way function operation as that used for creating the verification code is compared with the verification code corresponding to the presentation pattern, to verify legitimacy of the one-time password. In this case, the legitimacy of the one-time password can be verified even if the verification code is not hashed. However, the non-hashed verification code is identical to the legitimate verification code, which causes a problem that, if the client PC is analyzed by a malicious third person, a plurality of presentation pattern/ legitimate one-time password pairs will become known, and the one-time-password derivation rule as a password will be specified. In contrast, when the verification code is hashed, it becomes impossible to specify the legitimate one-time-password derivation rule based on the verification code. Thus, even if the client PC is analyzed by a malicious third person, the one-time-password derivation rule as a password will never be leaked.

[Term: One-Way Function and Hash Function]

A one-way function means a function having a feature that, although it is easy to calculate an output to be obtained by applying it to a certain input value, it is extremely difficult to derive the original input value from the output value. A hash function means a function which has the one-wayness as the feature of the one-way function, and a collision resistance, i.e., a feature that, when it is applied to a plurality of different original input values, resulting output values are extremely less likely to become identical to each other. Generally, the hash function is adapted to create output values in a constant range, regardless of an input value. The concept of the one-way function encompasses the hash function, and the one-way function and the hash function can be used in approximately the same manner. However, in cases where a higher collision resistance is required due to a relatively wide range of input values, etc., it is preferable to use the hash function. In the present invention, while the hash function may be obviously used in place of the one-way function, the one-way function may also be used in place of the hash function.

[Configuration of Content Presentation-Type Authentication System]

Figure 1:
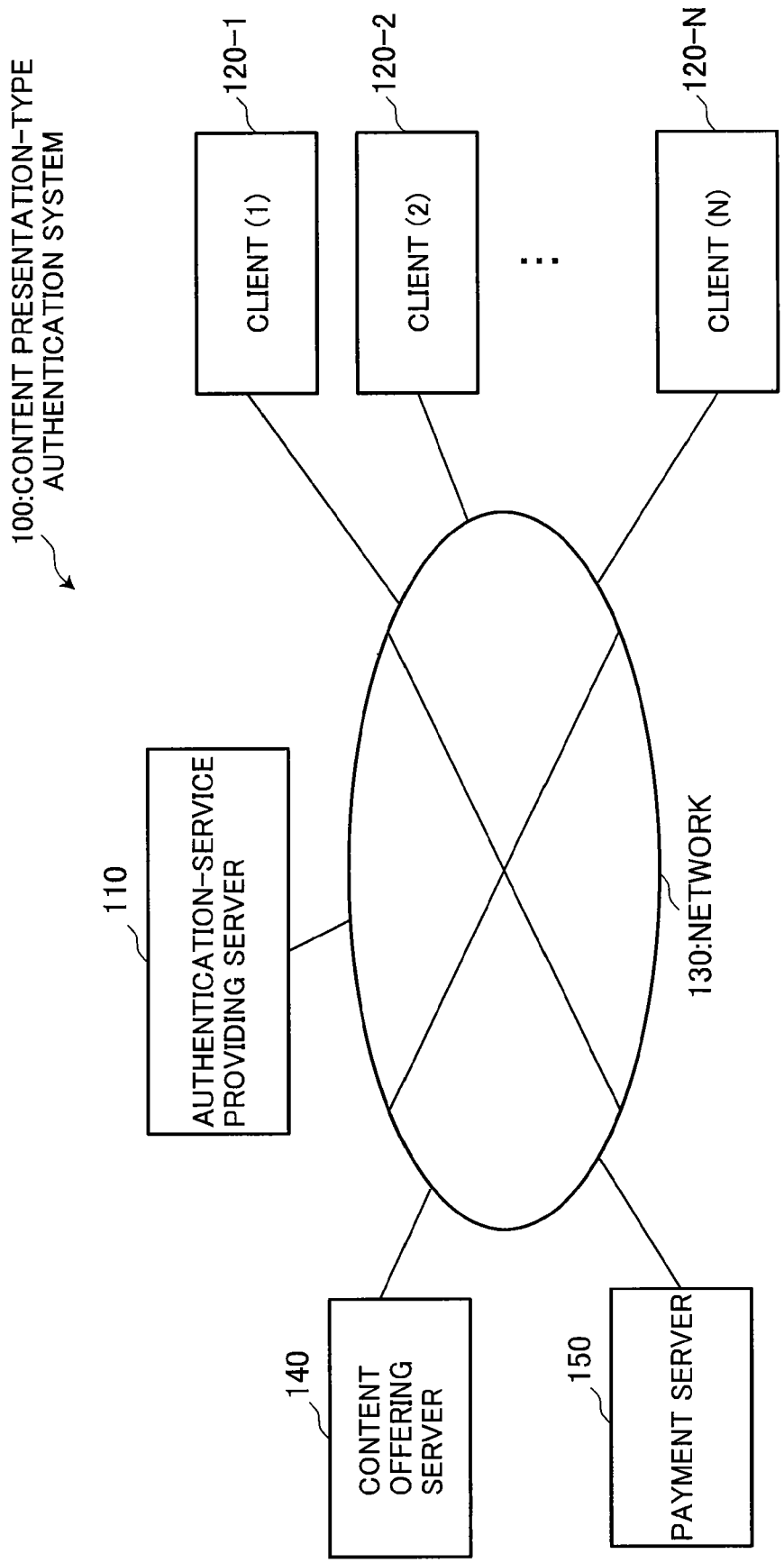
FIG. 1 is a block diagram showing a configuration of a content presentation-type authentication system according to a first embodiment of the present invention.

FIG. 1 is a block diagram showing a configuration of a content presentation-type authentication system according to a first embodiment of the present invention. A content presentation-type authentication system 100 according to the first embodiment comprises a plurality of clients 120-1 to 120-N, such as PCs or portable phones, of users, and an authentication-service providing server 110 for providing an authentication service to the clients of the users. The authentication-service providing server 110 and the client 120 are connected to each other via a network 130. The network may be a Windows (trademark) domain network which operates in accordance with a TCP/IP-based protocol. Although this specification is described by taking Windows (trademark) as an example of an operating system (OS), any other suitable OS, such as Mac OS (trademark), Linux (trademark) or Unix (trademark), may be used. The authentication-service providing server 110 may further comprise a content offering server 140 and a payment server 150. The content offering server 140 is designed to offer, to the authentication-service providing server 110, content information to be provided to the client 120. The payment server 150 is designed to allow online payment when a monetary transfer occurs between a content offerer and an authentication-service provider. Each of the content offering server 140 and the payment server 150 may be connected to the authentication-service providing server 110 via the network 130, or may be directly connected to the authentication-service providing server 110 via a private line.

[Hardware Configuration of Content Presentation-Type Authentication System]

Figure 2:
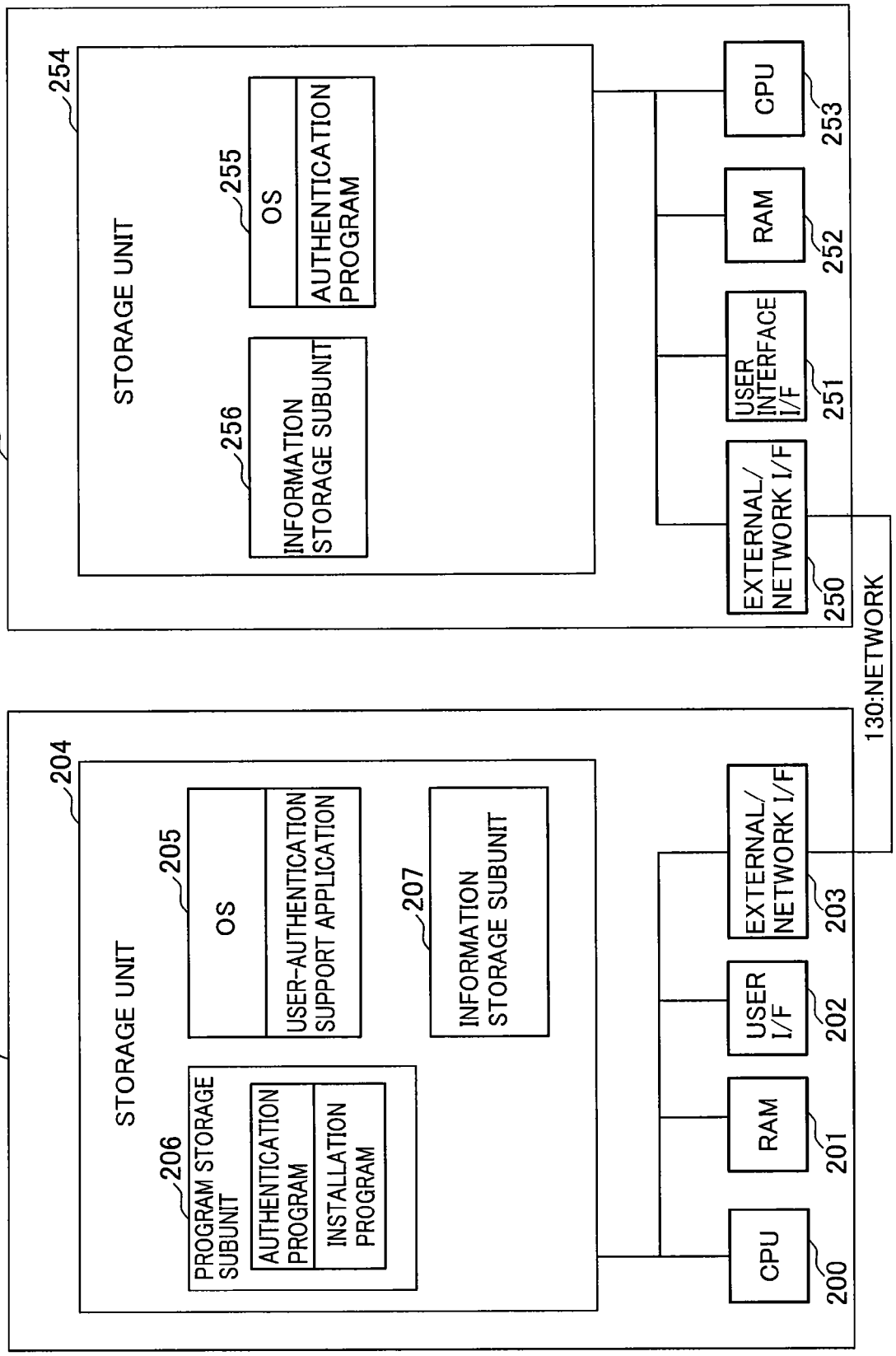
FIG. 2 is a block diagram showing respective hardware configurations of an authentication-service providing server and a client in the content presentation-type authentication system according to the first embodiment.

With reference to FIG. 2, respective hardware configurations of the authentication-service providing server 110 and the client 120 in the content presentation-type authentication system 100 will be described below. The same element or component as that illustrated in FIG. 1 is indicated in FIG. 2 using the same reference numeral.

The authentication-service providing server 110 comprises a CPU 200, a RAM 201, a user interface (I/F) 202, an external/network interface (I/F) 203 and a storage unit 204. The storage unit 204 stores an OS and a user-authentication support application in a storage area 205 thereof, and includes a program storage subunit 206 and an information storage subunit 207. The program storage subunit 206 stores therein a content presentation-type user authentication program and an installation program. The content presentation-type user authentication program is designed to, when it is run on the client 120, allow the client 120 to perform a content presentation-type user authentication which includes forcibly presenting a content to a user in connection with user authentication. The installation program is designed to install the content presentation-type user authentication program onto the client. The information storage subunit 207 stores therein user information about each of the users, a one-time-password derivation rule as a password of the user, content information about a content to be presented to the user, authentication information necessary for the user authentication, etc. The information storage subunit 207 may be packaged as a device different from the authentication-service providing server 110, or may be packaged as a plurality of devices separated by information type.

The client 120 comprises an external/network interface (I/F) 250, a user interface (I/F) 251, a RAM 252, a CPU 253 and a storage unit 254. The storage unit 254 stores an OS and the content presentation-type user authentication program in a storage area 255 thereof. The storage unit 254 further stores the authentication information necessary for the user authentication of the user of the client, etc., in an information storage subunit 256. In cases where the content presentation-type user authentication program is a preinstalled program preliminarily built in the OS, the authentication-service providing server 110 is not required to store the content presentation-type user authentication program and the installation program, and the client 120 is not required to store the installation program.

[Functional Configuration of Content Presentation-Type Authentication System According to First Embodiment]

Figure 3:
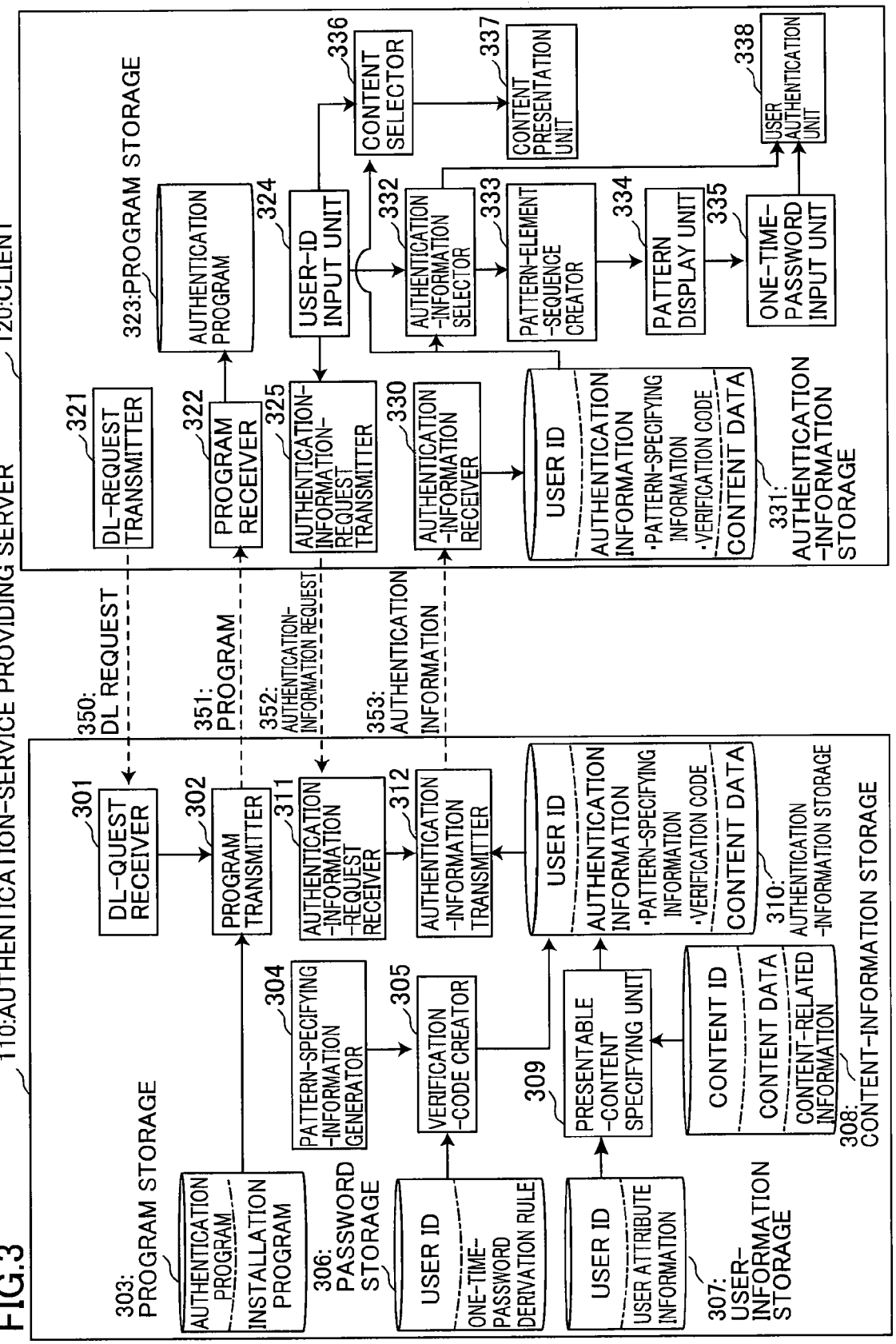
FIG. 3 is a block diagram showing respective functional configurations of the authentication-service providing server and the client in the content presentation-type authentication system according to the first embodiment.

A functional configuration of the content presentation-type authentication system 100 according to the first embodiment will be described below. FIG. 3 is a block diagram showing respective functional configurations of the authentication-service providing server 110 and the client 120 in the first embodiment to be achieved by running the user-authentication support application on the CPU 200 of the authentication-service providing server 110 while running the content presentation-type user authentication program on the CPU 253 of the client 120, based on the hardware configurations of the authentication-service providing server 110 and the client 120 illustrated in FIG. 2.

In the first embodiment, each of a download-request receiver 301, a program transmitter 302, an authentication-information-request receiver 311 and an authentication-information transmitter 312 in the authentication-service providing server 110 is a functional block achievable by cooperation between hardware, such as the CPU 200, the RAM 201 and the external/network interface 203, and software, such as the user-authentication support application, in the authentication-service providing server 110. The download-request receiver 301 is operable to receive a download request 350 for download of the authentication program. The program transmitter 302 is operable, in response to receiving the download request by the download-request receiver 301, to read an installation program and an authentication program 351 from program storage 303, and transmit them. The authentication-information-request receiver 311 is operable to receive an authentication-information request 352 for authentication information to be used for the user authentication. The authentication-information transmitter 312 is operable, in response to receiving the authentication-information request 352 by the authentication-information-request receiver 311, to read corresponding content-added authentication information 353 from after-mentioned authentication-information storage 310, and transmit it to the client 120.

Each of program storage 303, password storage 306, user-information storage 307, content-information storage 308 and authentication-information storage 310 is a functional block achievable by cooperation between hardware, such as the CPU 200, the RAM 201, the program storage subunit 206 and the information storage subunit 207, and software, such as the user-authentication support application, in the authentication-service providing server 110. The program storage 303 is operable to store therein the authentication program to be run on the client 120, and the installation program for installing the authentication program onto the client 120. The password storage 306 is operable to store therein a user ID of each of the users, and a one-time-password derivation rule for the user ID, in a mutually associated manner. The user-information storage 307 is operable to store therein the user ID of each of the users, and user attribute information for the user ID, in a mutually associated manner. The content-information storage 308 is operable to store therein a content ID of each of a plurality of contents, content data for the content ID, and content-related information, in a mutually associated manner. The authentication-information storage 310 is operable to store therein the authentication information and the content data for each of the user IDs, in a mutually associated manner, as content-added authentication information. The authentication-information storage 310 may be configured to store the content-added authentication information in a nonvolatile memory, such as a hard disk, or may be configured to store the content-added authentication information in a volatile memory, such as a RAM.

Each of a pattern-specifying-information generator 304, a verification-code creator 305 and a presentable-content specifying unit 309 is a functional block achievable by cooperation between hardware, such as the CPU 200 and the RAM 201, and software, such as the user-authentication support application, in the authentication-service providing server 110. The pattern-specifying-information generator 304 is operable to generate a plurality of pattern-specifying information at a given timing in accordance with a given generation rule. The verification-code creator 305 is operable to create a verification code by reading the user ID of each of the users and the one-time-password derivation rule for the user ID from the password storage 306, applying the one-time-password derivation rule associated with the user ID to a presentation pattern specified based on each of the plurality of generated pattern-specifying information, and then subjecting the obtained result to a one-way function operation, and output the verification code to the authentication-information storage 310 together with the pattern-specifying information. The presentable-content specifying unit 309 is operable to specify the content ID of the content to be forcibly presented to each of the users, based on the user attribute information and the content-related information, and output the specified content ID to the authentication-information storage 310.

Each of a download-request transmitter 321, a program receiver 322, a user-ID input unit 324, an authentication-information-request transmitter 325, an authentication-information receiver 330, pattern display unit 334, a one-time-password input unit 335 and a content presentation unit 337 in the client 120 is a functional block achievable by cooperation between hardware, such as the external/network interface 250, the user interface 251, the RAM 252 and the CPU 253, and software, such as the authentication program, in the client 120. The download-request transmitter 321 is operable to transmit the download request 350 for download of the authentication program. The program receiver 322 is operable to receive the installation program and the authentication program 351. The user-ID input unit 324 is operable to accept an entry of the user ID of the user, and output the entered user ID to each of the authentication-information-request transmitter 325, the after-mentioned authentication-information selector 332 and the after-mentioned content selector 336. The authentication-information-request transmitter 325 is operable to transmit the authentication-information request 325 for authentication information to be used for the user authentication. The authentication-information receiver 330 is operable to receive the content-added authentication information 353. The pattern display unit 334 is operable to display a presentation pattern based on a pattern element sequence created by the after-mentioned pattern-element-sequence creator 333. The one-time-password input unit 335 is operable to accept an entry of a one-time password from the user, based on the presentation pattern displayed by the pattern display unit 334. The content presentation unit 337 is operable to forcibly present a content to the user, based on a given number of content data selected by the content selector 336.

Each of program storage 323 and authentication-information storage 331 is a functional block achievable by cooperation between hardware, such as the RAM 252, the CPU 253 and the information storage subunit 256, and software, such as the authentication program, in the client 120. The program storage 323 is operable to store therein the authentication program received by the program receiver 322. The authentication-information storage 331 is operable to store therein the content-added authentication information 353 received by the authentication-information receiver 330.

Each of an authentication-information selector 332, a pattern-element-sequence creator 333, a content selector 336 and a user authentication unit 338 is a functional block achievable by cooperation between hardware, such as the RAM 252 and the CPU 253, and software, such as the authentication program, in the client 120. The authentication-information selector 332 is operable to select one of a plurality of authentication information for the user ID output from the user-ID input unit 324, and output the selected authentication information to each of the pattern-element-sequence creator 333 and the user authentication unit 338. The pattern-element-sequence creator 333 is operable to create a pattern element sequence based on pattern-specifying information contained in the authentication information received from the authentication-information selector 332, and output the pattern element sequence to the pattern display unit 334. The content selector 336 is operable to selectively read a given number of content data for the user ID received from the user-ID input unit 324, from the authentication-information storage 331, and output the content data to the content presentation unit 337. The user authentication unit 338 is operable to compare a code created by subjecting the one-time password entered from the one-time-password input unit 335 to the one-way function operation, and the verification code contained in the authentication information received from the authentication-information selector 332, and, when they are identical to each other, to successfully authenticate the user.

[Operation of Content Presentation-Type Authentication System According to First Embodiment]

Figure 4:
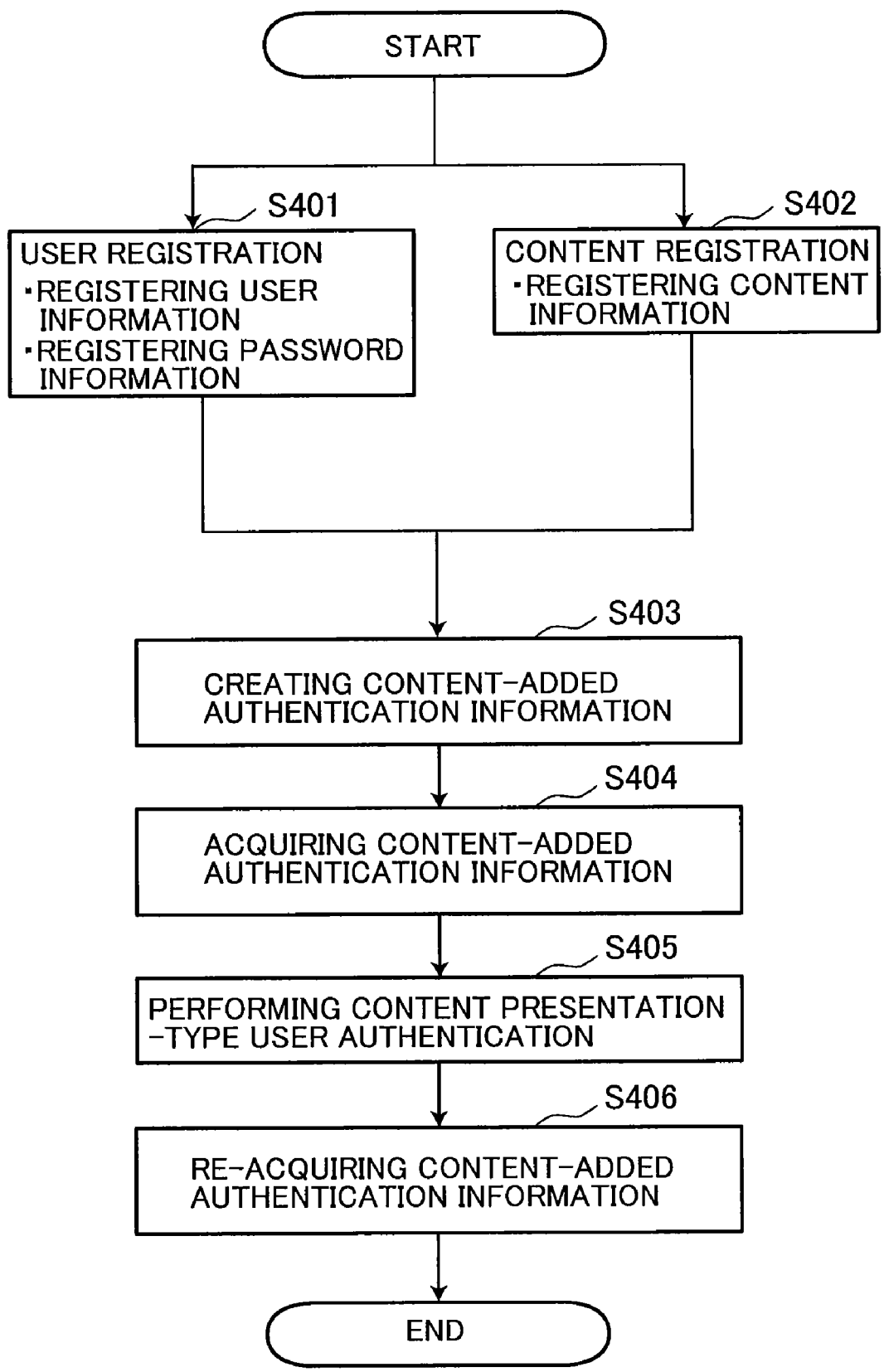
FIG. 4 is a flowchart showing an outline of the entire process in the content presentation-type authentication system according to the first embodiment.

An operation of the content presentation-type authentication system according to the first embodiment will be described below. FIG. 4 illustrates an outline of the entire process in the content presentation-type authentication system according to the first embodiment. In the process in the first embodiment, user information, and password information for a user authentication, are registered on the authentication-service providing server 110, in a user registration stage (S401). Further, in a content registration stage (S402), content information is registered on the authentication-service providing server 110. Then, in a content-added-authentication-information creation stage (S403), content-added authentication information is created for each of the user IDs, based on the registered user information, password information and content information. Then, in a content-added-authentication-information acquisition stage (S404), the content-added authentication information is transmitted from the authentication-service providing server 110 to the client 120. Then, in a content presentation-type user authentication stage (S405), a content is forcibly presented to a user who intends to be authenticated, based on the content-added authentication information for the user ID of the user, in connection with the user authentication. Subsequently, in a content-added-authentication-information re-acquisition stage (S406), it is determined whether all of a plurality of authentication information stored in the client 120 in a manner associated with the user ID of the user have been selected, and, when all of the plurality of authentication information have been used, the client 120 re-acquires new content-added authentication information from the authentication-service providing server 110. Each of the above stages will be more specifically described below.

[User Registration Stage]

Figure 5:
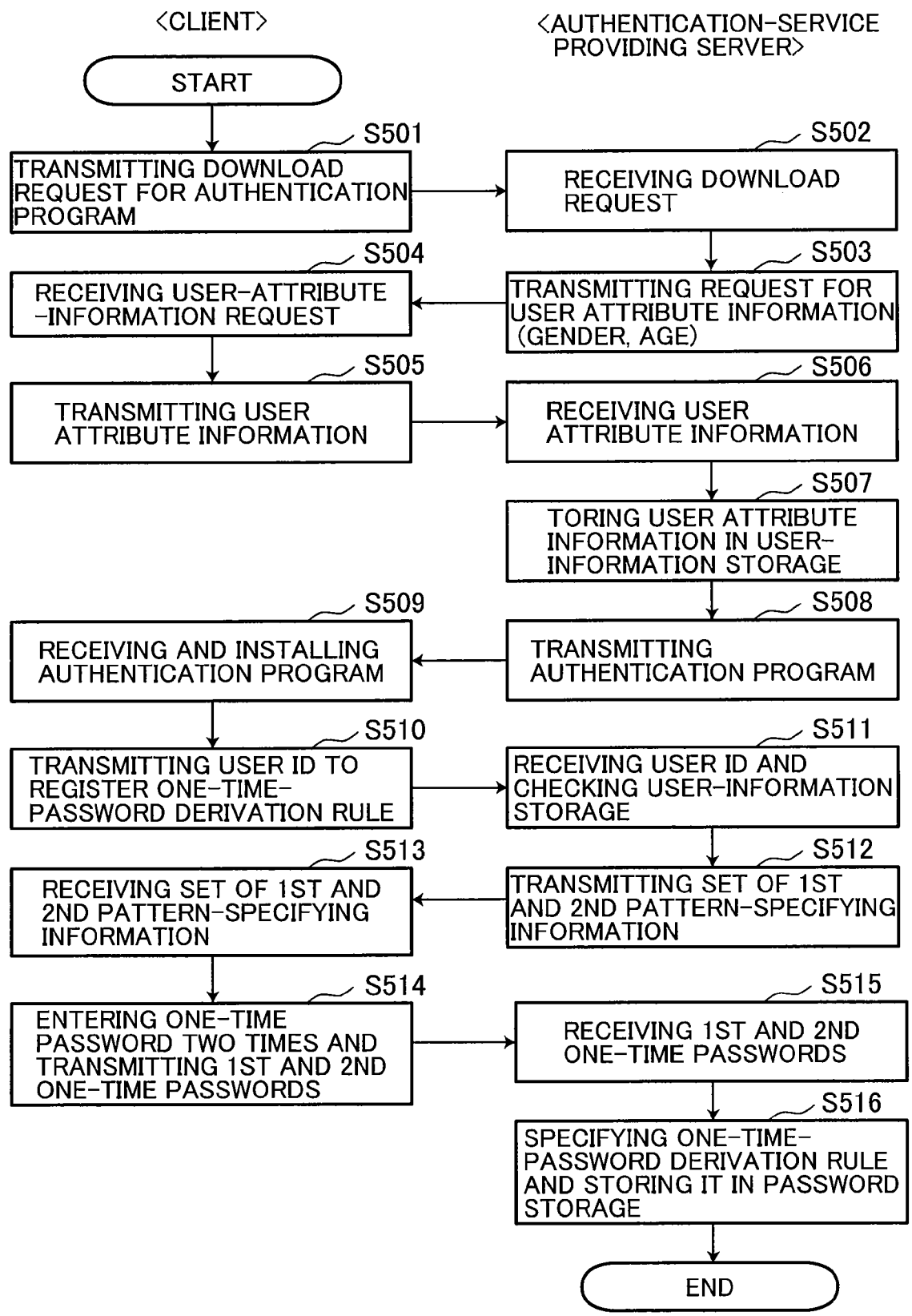
FIG. 5 is a flowchart showing a user registration stage in a content presentation-type authentication in the first embodiment.

FIG. 5 is a flowchart showing the user registration stage. Although user authentication in the first embodiment is authentication for Windows (trademark) logon, it may be any other user authentication, such as authentication for other OS logon or authentication for corporate network logon. Firstly, a user who intends to use a content presentation-type authentication service transmits a download request from the client 120 to the authentication-service providing server 110, by the download-request transmitter 321, in order to download the content presentation-type user authentication program (S501). In the first embodiment, the transmitting of the download request from the client 120 is performed by accessing a Web page provided by the authentication-service providing server 110 to allow for download of the program. When the download-request receiver 301 receives the download request (S502), the authentication-service providing server 110 requests the client to transmit user attribute information indicative of an attribute of the user, such as age and gender (S503). In the first embodiment, the transmitting of the user-attribute-information request is performed by requesting the user to enter the user attribute information indicative of an attribute of the user (age and gender) in advance of the download. When the client 120 receives the user-attribute-information request (S504), the user transmits the user attribute information from the client 120 (S505). In the first embodiment, the user enters the above information from the user interface, such as a keyboard, into a Web page of the authentication-service providing server 110, to transmit the information to the authentication-service providing server 110. The authentication-service providing server 110 receives the user attribute information (S506), and stores the user attribute information in the user-information storage 307 while adding a registration date thereto and assigning a user ID thereto (S507). In the first embodiment, the user-information storage 307 stores therein the user ID and the user attribute information in a mutually associated manner illustrated in FIG. 6. The user attribute information may further include birth date, residence area and hobby, or may be devoid of age, gender and registration data.

Then, the authentication-service providing server 110 reads the content presentation-type user authentication program and the installation program from the program storage 303 and transmits them to the client 120, by the program transmitter 302 (S508). The client 120 installs the content presentation-type user authentication program by executing the installation program received by the program receiver 322 (S509). In the first embodiment, the installation unit to change a Windows setup in such a manner as to start the content presentation-type user authentication program in place of a user authentication based on a logon authentication program built in the Windows of the client.

Specifically, the setup change of the Windows logon authentication program is performed as follows. Firstly, the content presentation-type user authentication program is created as a Windows DLL file. In this example, a DLL file having a name "SmxGina.dll" is created. Further, a program of an authentication screen image for Windows login is designated as data having a key name "GinaDLL" in the following registry location:

HKEY_LOCAL_MACHINE_MACHINE\SOFTWARE\
Microsoft\Windows NT\CurrentVersion\Winlogon A Windows' built-in logon authentication module is a DLL file having a name "msgina.dll", and configured as the aforementioned data having the key name "GinaDLL". When the data having the above key is rewritten into "SmxGina.dll", a logon authentication module "SmxGinaDLL" for implementing an authentication process in the present invention will be invoked during a logon authentication.

The content presentation-type user authentication program and the installation program may be an integrated program. Instead of the above procedure, the installation program may be configured such that, when the user downloads and then starts the installation program, it is operable to download the content presentation-type user authentication program to the client 120. Alternatively, the content presentation-type user authentication program and the installation program may be stored in a storage medium, such as a CD or a DVD, and transmitted to the user by mail or the like, and the user may install the programs onto the client. Further, the content presentation-type user authentication program may be a logon authentication program preliminarily built in the Windows. The user attribute information may be registered by accessing a Web page provided by the authentication-service providing server 110 to allow for registration of user attribute information, independently of the procedure for download of the content presentation-type user authentication program. The user attribute information may be transmitted from the user to an authentication-service provider by mail or the like, and the authentication-service provider may enter the user attribute information into the authentication-service providing server 110 through the user interface.

Then, the user who intends to be authenticated registers a one-time-password derivation rule as a password, onto the authentication-service providing server 110. In this registration, when the content presentation-type user authentication program installed on the client 120 is run on the CPU 253 of the client 120, a screen image for entering the user ID of the user who intends to register a one-time-password derivation rule is displayed. Then, the user enters the user ID through the user-ID input unit 324, and transmits the user ID to the authentication-service providing server 110 (S510). In response to receiving the user ID, the authentication-service providing server 110 checks whether the received user ID is stored in the user-information storage 307 (S511). When the user ID has already been stored, the authentication-service providing server 110 transmits a set of 1st and second pattern-specifying information for a password registration (S512). If the user ID is unregistered, the authentication-service providing server 110 transmits an NG message, and the client 120 indicates that an unregistered user ID has been entered, and re-displays an input screen image for entering the user ID (not illustrated in FIG. 5).

In response to receiving the set of 1st and 2nd pattern-specifying information (S513), the client 120 displays 1st and 2nd presentation patterns at given time intervals based on the 1st and 2nd pattern-specifying information, and the user enters a one-time password two times by selecting certain ones of a plurality of pattern elements contained in each of the 1st and 2nd presentation patterns, in accordance with a one-time-password derivation rule to be registered by the user (S514). The client 120 transmits the entered 1st and 2nd one-time passwords to the authentication-service providing server 110 (S514).

The authentication-service providing server 110 receives the 1st and 2nd one-time passwords (S515). Then, the authentication-service providing server 110 specifies the one-time-password derivation rule of the user based on the transmitted 1st and 2nd pattern-specifying information and the received 1st and 2nd one-time passwords, and stores the one-time-password derivation rule in the password storage 306 of the authentication-service providing server 110 in a manner associated with the user ID of the user (S516). In the first embodiment, the password storage 306 stores therein the user ID and the one-time-password derivation rule in a mutually associated manner illustrated in FIG. 7. Then, the authentication-service providing server 110 transmits an OK message indicating that the password registration is normally performed, to the client (not illustrated in FIG. 5). In response to receiving the OK message, the client 120 displays the registered one-time-password derivation rule on a display unit thereof to allow the user to confirm the one-time-password derivation rule (not illustrated in FIG. 5). Then, the user registration stage is completed.

The one-time-password derivation rule can be specified based on the 1st and 2nd presentation patterns by generating the 1st and 2nd presentation patterns in such a manner that the 2nd presentation pattern becomes largely different from the 1st presentation pattern. If the one-time-password derivation rule cannot be specified based on the 1st and 2nd presentation patterns, the authentication-service providing server 110 will transmit new pattern-specifying information, and the client will repeatedly transmit a one-time password based on the new pattern-specifying information, until the one-time-password derivation rule can be specified (not illustrated in FIG. 5). Although the pattern-specifying information in the first embodiment is transmitted two at a time from the authentication-service providing server 110, the pattern-specifying information may be transmitted one at a time, or may be transmitted three or more at a time.

[Content Registration Stage]

Figure 8:
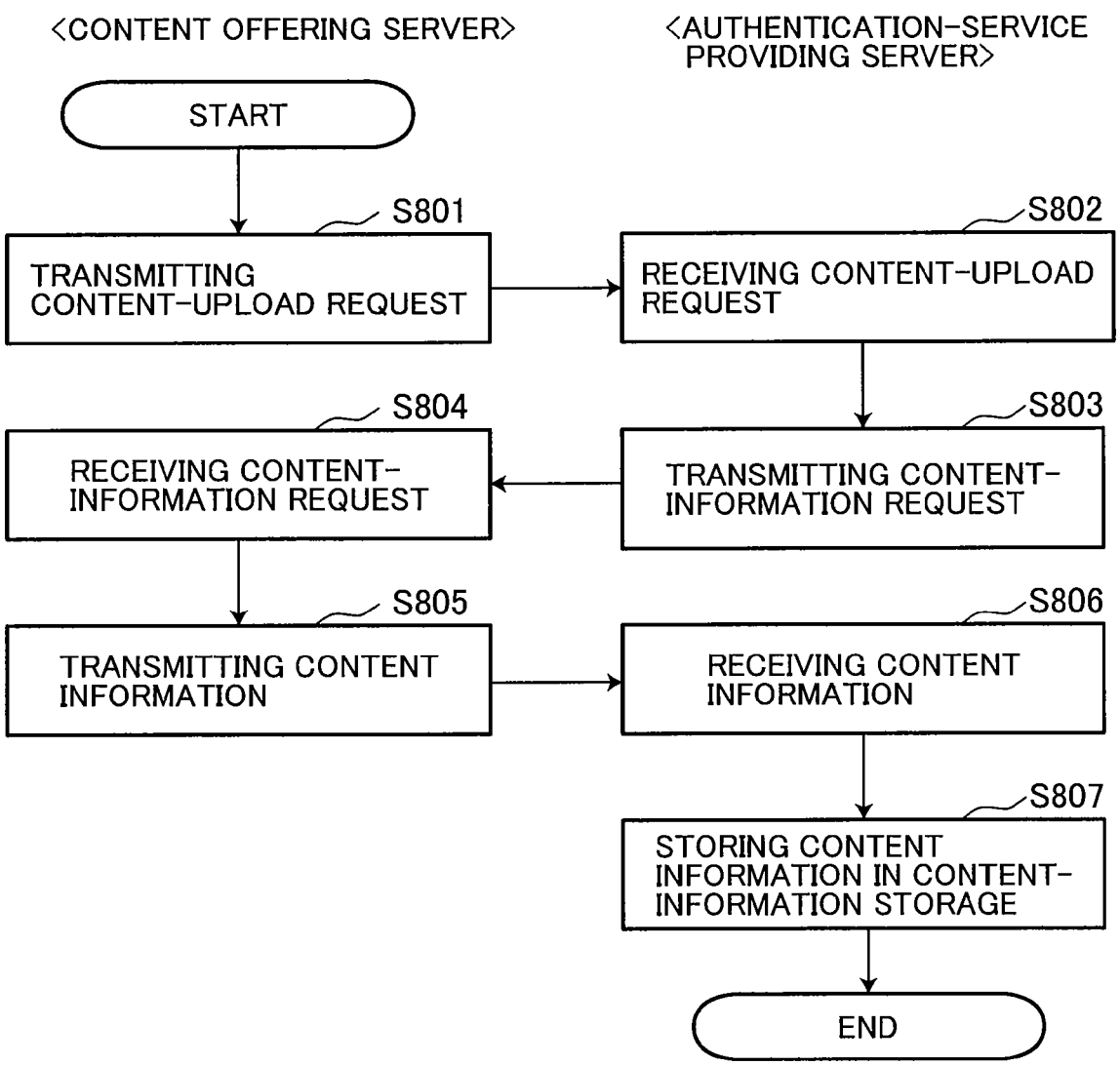
FIG. 8 is a flowchart showing a content registration stage in the content presentation-type authentication in the first embodiment.

FIG. 8 is a flowchart showing a content registration stage. Firstly, the content offering server 140 transmits an upload request for a content, to the authentication-service providing server 110 (S801). Typically, a content is service information such as an advertisement or product support information, or a promotional music or video for a music or a movie. Further, the content may be one selected from the group consisting of news, a novel, a movie, a photograph, a TV program, an animation, a music and a cartoon. In the first embodiment, the transmitting of the content-upload request from the content offering server 140 is performed by accessing a Web page provided by the authentication-service providing server 110 to allow for upload of a content. In response to receiving the content-upload request (S802), the authentication-service providing server 110 transmits a request for content information (S803). In the first embodiment, the transmitting of the content-information request from the authentication-service providing server 110 is performed by requesting for an entry of content information on the Web page. The content information includes a name of a content offerer who intends to offer a content, content data indicative of a detail of the content, and content-related information. The content-related information includes a content-presentation target user condition. The content-presentation target user condition may be gender (man or woman) and/or age (e.g., teens to twenties) to which the content offerer intends to present the content. The content-related information may include any other information depending on a type or detail of a content. In response to receiving the content-information request (S804), the content offering server 140 enters and transmits content information on the Web page to perform the transmitting of the content information (S805). In response to receiving the content information (S806), the authentication-service providing server 110 stores received content information in the content-information storage 308 while assigning a content ID and a content offerer ID thereto (S807). The content-information storage 308 stores the content data, the content ID, the content offerer ID and the content-related information, in a mutually associated manner illustrated in FIG. 9.

Further, the payment server 150 can be used to perform online payment between the authentication-service provider and the content offerer. Typically, in cases where the content is an advertisement, the content offerer pays an advertisement fee to the authentication-service provider, based on a total number of user IDs to which the advertisement is delivered, or a total number of times the advertisement is presented to users. The authentication-service providing server 110 or the content offering server 140 requesting for payment is operable to access the payment server 150 at a given timing so as to issue a payment request for making the above payment. The content offering server 140 can specify a liable content by the content offerer ID.

[Content-Added-Authentication-Information Creation Stage]

Figure 10:
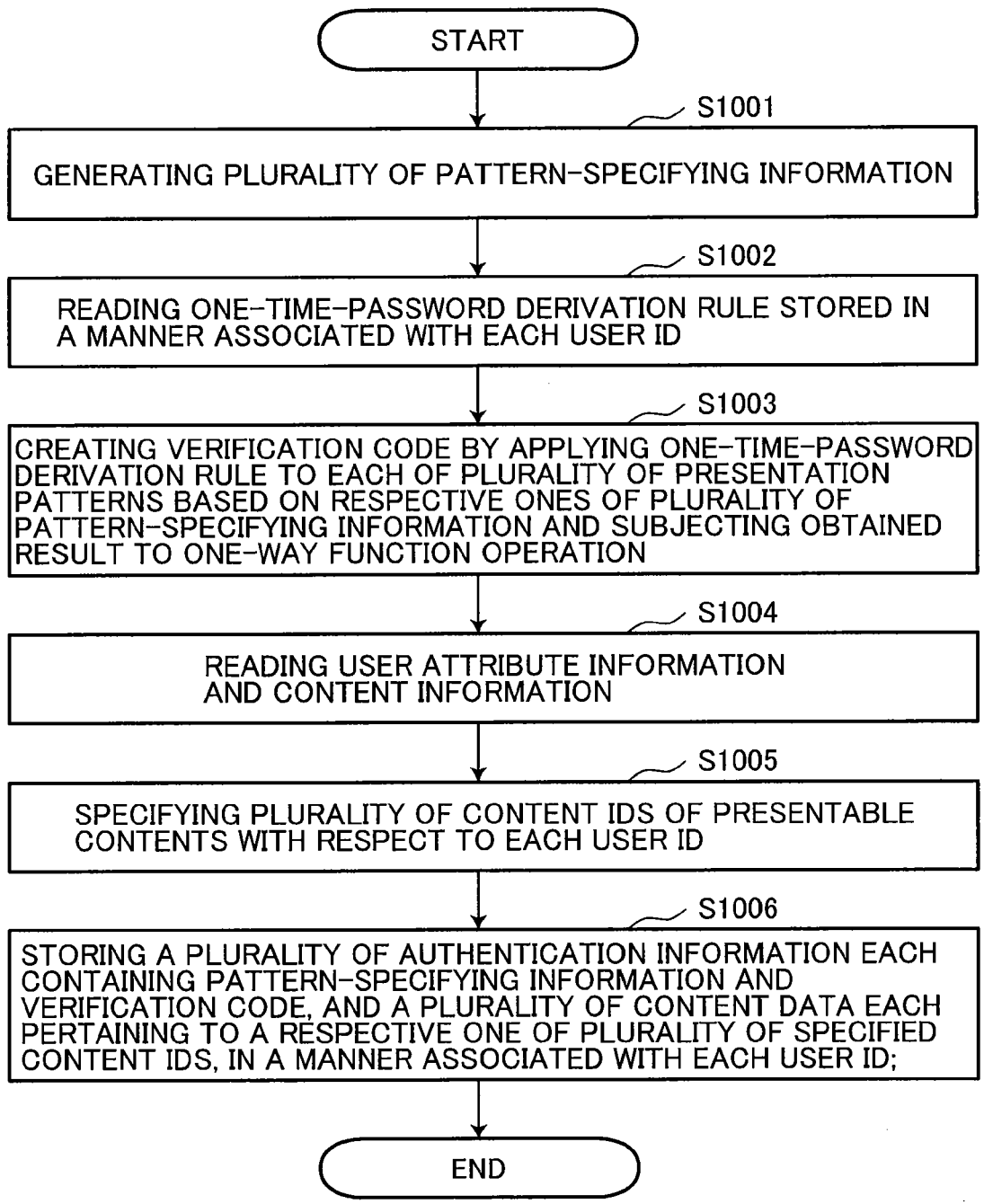
FIG. 10 is a flowchart showing a content-added-authentication-information creation stage in the content presentation-type authentication in the first embodiment.

FIG. 10 is a flowchart showing a content-added-authentication-information creation stage. This stage may be simultaneously performed with respect to a plurality of or all user IDs, or may be performed with respect to one of the user IDs. This stage is started at a given timing. Typically, the given timing is a timing at which a new user ID is registered, a timing at which the authentication-service providing server 110 receives an authentication-information request from an after-mentioned client 120, or a timing designated by after-mentioned authentication-information updater. Firstly, the pattern-specifying-information generator 304 generates a plurality of pattern-specifying information in accordance with a given generation rule (S1001). Typically, the given generation rule is to generate a 64-digit random number serving as a pattern element sequence or a pattern seed value, and form the generated random number into the plurality of pattern-specifying information. The verification-code creator 305 reads each of the user IDs, and the one-time-password derivation rule for the user ID, from the password storage 306

(S1002). Then, the verification-code creator 305 create a verification code by applying the one-time-password derivation rule for each of the user IDs to each of a plurality of presentation patterns specified based on respective ones of the plurality of pattern-specifying information generated in accordance with the given generation rule, and subjecting the obtained result to a one-way function operation (S1003).

In cases where the pattern-specifying information is a pattern element sequence itself, a given rule for specifying a presentation pattern based on the pattern-specifying information is typically to arrange a plurality of pattern elements included in the pattern element sequence at respective positions in the pattern format consisting of four 4×4 matrixes. Further, in cases where the pattern-specifying information is a pattern seed value, a presentation pattern is specified by creating a pattern element sequence based on the pattern seed value, and arranging a plurality of pattern elements included in the created pattern element sequence at respective positions in the pattern format consisting of four 4×4 matrixes. For example, a numerical sequence making up a pattern seed value is subjected to an encryption operation using it as one type of initial value, to create a bit sequence having a given bit length. In this example, the given bit length is 256 bits which are an information amount enough to create a presentation pattern 2190 consisting of 64 numerals. The encryption operation may be any type capable of practically precluding an original numerical sequence from being derived from an operation result, such as a hash function operation or a common-key encryption operation. For example, the SHA-256 may be used as a hash function to encrypt a predefined numerical sequence so as to create a 256-bit sequence. Alternatively, the AES may be used as a common-key encryption operation to create a key from a predefined numeric sequence and encrypt a 256-bit numerical sequence appropriately preset using the key so as to create a 256-bit sequence. Then, the 256-bit sequence is converted to a 77-digit decimal numeral, and a 64-digit numeral is extracted therefrom to form a pattern element sequence. The extraction of the 64-digit numeral may be achieved using any suitable operation, such as elimination of an unnecessary higher-order bit sequence or an unnecessary lower-order bit sequence, or division. As above, a presentation pattern may be specified based on a pattern seed value and in accordance with a given rule. In this case, even if the pattern seed value is stolen through sniffing or the like, the presentation pattern cannot be specified unless the given rule is known. Thus, even if a one-time password entered based on the presentation pattern is stolen, the one-time-password derivation rule cannot be specified, so that it becomes possible to provide high security. Further, a pattern seed value may be used in combination with a user ID to specify a presentation pattern. For example, a pattern element sequence is generated in such a manner that, although it uniquely defined with respect to the combination of a pattern seed value and a user ID, it is extremely difficult to estimate the pattern seed value and the user ID only from the pattern element sequence. Typically, a presentation pattern is specified using the combination of a pattern seed value and a user ID as one type of initial value, in the same manner as that in the above example based on only a pattern seed value. As the combination of a pattern seed value and a user ID, a pattern seed value and a user ID each expressed as a hexadecimal numeral may be combined together using any suitable operation, such as conjunction, addition, subtraction or exclusive OR. As above, a pattern seed value may be used in combination with a user ID. This makes it further difficult for a malicious third person to specify a presentation pattern, so that it becomes possible to provide higher security.

Then, the presentable-content specifying unit 309 performs a processing of specifying a content to be forcibly present to each of the users, based on the user attribute information and the content-related information. Specifically, the presentable-content specifying unit 309 reads the user ID and the user attribute information from the user-information storage 307, and reads the content ID, the content data and the content-related information from the content-information storage 308 (S1004). Then, with respect to each of the user IDs, the presentable-content specifying unit 309 specifies a plurality of the content IDs on condition that the user attribute information associated with the user ID satisfies the content-presentation target user condition contained in the content-related information associated with each of the plurality of content IDs (S1005). For example, when user attribute information associated with a user ID "U000" is "gender"="woman" and "age"="15", a content ID "C000" having a content-presentation target user condition defined as "gender"="woman" and "age"="teens" is specified as a presentable content for the user ID "U000". However, a content ID "C001" having a content-presentation target user condition defined as "gender"="man" and "age"="teens" is not specified as a presentable content for the user ID "U000". In cases where the content is a pay content such as a music, the content-presentation target user condition may include a condition that a user is a purchaser of the pay content, and the user attribute information may include information indicative of whether a user is a purchaser of the pay content. In this manner, a content offerer can present a content only to users who desire to present the content.

Then, based on the plurality of pattern-specifying information and the plurality of verification codes received from the verification-code creator 305 and the plurality of specified content IDs received from the presentable-content specifying unit 309, the authentication-information storage 310 stores therein a plurality of authentication information for each of the user IDs, and a plurality of the content data each pertaining to a respective one of the plurality of specified content IDs, with respect to each of the user IDs (S1006). As used in this specification, information containing the plurality of authentication information and the plurality of content data will be referred to as "content-added authentication information". Each of the plurality of authentication information contains one of the plurality of the pattern-specifying information, and one of the plurality of verification codes which is created based on the pattern-specifying information and the one-time-password derivation rule. The authentication-information storage 310 stores the plurality of authentication information each containing the pattern-specifying information and the verification code, and the plurality of content data, in a manner associated with each of the user IDs as illustrated in FIG. 11. The authentication-information storage 310 may preliminarily create and store therein the content-added authentication information in advance of an authentication-information request from the client 120. The content-added authentication information may be stored in a nonvolatile memory, such as a hard disk, or may be stored in a volatile memory, such as a RAM. Based on preliminarily creating and storing the content-added authentication information, the content-added authentication information can be provided in response to an authentication-information request from the client, in a minimum server load. Alternatively, after the content-added-authentication-information creation stage is started in response to an authentication-information request, content-added authentication information created for an user ID contained in the authentication-information request may be temporarily stored in order to transmit it to the client 120. In this case, it is preferable to store the content-added authentication information in a volatile memory, such as a RAM. This makes it possible to reduce a required storage capacity of a hard disk or the like.

[Content-Added-Authentication-Information Acquisition Stage]

Figure 12:
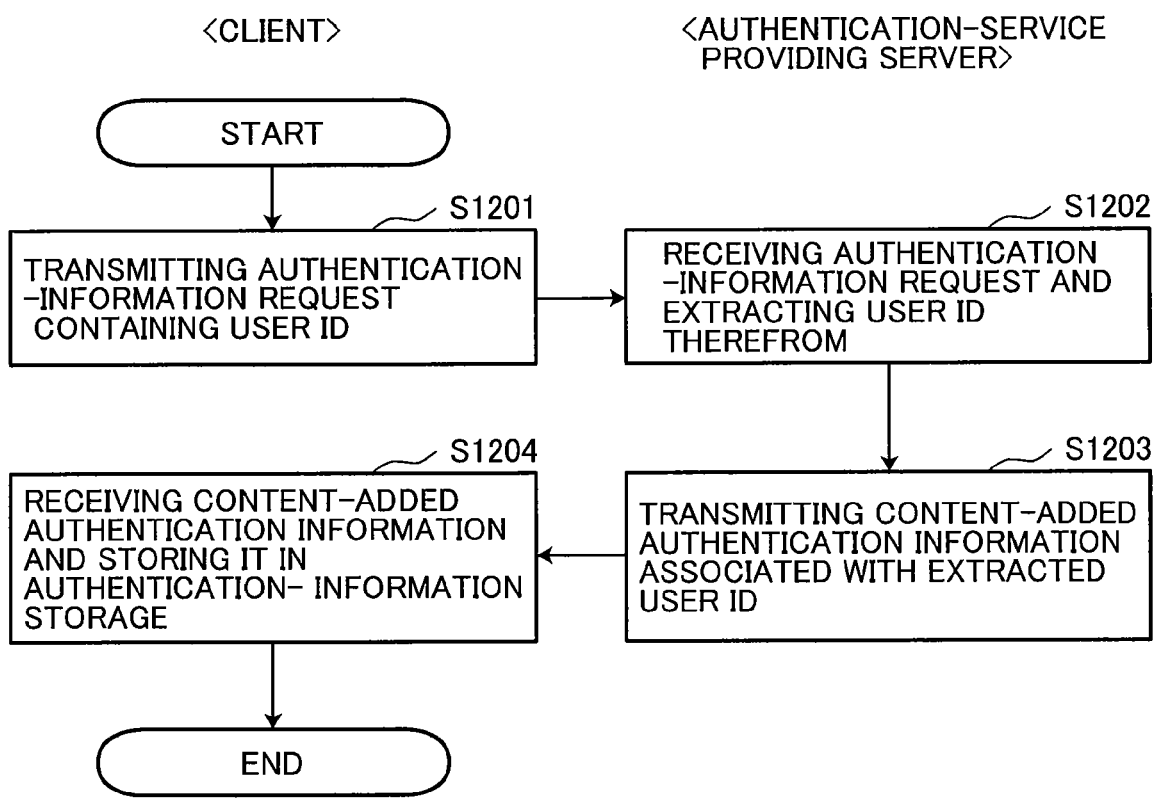
FIG. 12 is a flowchart showing a content-added-authentication-information acquisition stage in the content presentation-type authentication in the first embodiment.

FIG. 12 is a flowchart showing a content-added-authentication-information acquisition stage. In this stage, in advance to user authentication, the client 120 acquires the content-added authentication information containing the plurality of authentication information and the plurality of content data, from the authentication-service providing server 110. Based on the plurality of authentication information contained in the acquired content-added authentication information, the client 120 is allowed to perform the user authentication plural times. Thus, even when the client 120 is not connected to the server, i.e., in an off-line state, the user authentication can be performed a plural number of times which is equal to the number of the authentication information contained in the acquired content-added authentication information. This stage will be more specifically described below.

Firstly, before the user authentication, a user who intends to be authenticated transmits an authentication-information request for the authentication information, to the authentication-service providing server 110 through the authentication-information-request transmitter 325 of the client 120 (S1201). The authentication-information request contains a user ID of the user who intends to be authenticated. In the first embodiment, the transmitting of the authentication-information request is performed by accessing a Web page provided by the authentication-service providing server 110 to allow for acquisition of the authentication information, and entering the user ID of the user on the Web page to request for the authentication information. The authentication-service providing server 110 receives the authentication-information request containing the entered user ID transmitted from the client 120, and extracts the user ID from the received authentication-information request, through the authentication-information-request receiver 311 (S1202). Then, the authentication-service providing server 110 reads the plurality of authentication information and the plurality of content data each associated with the extracted user ID, from the authentication-information storage 310, and transmits the read content-added authentication information to the client 120, through the authentication-information transmitter 312 (S1203). The content-added authentication information to be transmitted by the authentication-information transmitter 312 may contain all of the authentication information and content data stored in the authentication-information storage 310 in a manner associated with the user ID of the user, or may contain a part of them. Then, the client 120 receives the content-added authentication information through the authentication-information receiver 330, and stores the received content-added authentication information in the authentication-information storage 331 of the client 120 in a manner associated with the entered user ID. The authentication-information storage 331 of the client 120 stores the content-added authentication information in the same manner as that in the authentication-information storage 310 of the authentication-service providing server 110 as illustrated in FIG. 11. Through the above operation, the content-added authentication information corresponding to the entered user ID is stored on the client 120 to allow the plurality of user authentications to be performed based thereon. As above, the content-added authentication information is stored on the client 120, so that it is not necessary to ensure connection between the client 120 and the server 110 during the user authentication, and the user authentication can be performed a plural number of times which is equal to the number of the authentication information contained in the stored content-added authentication information, in the off-line state.

[Content Presentation-Type Authentication Stage]

Figure 13:
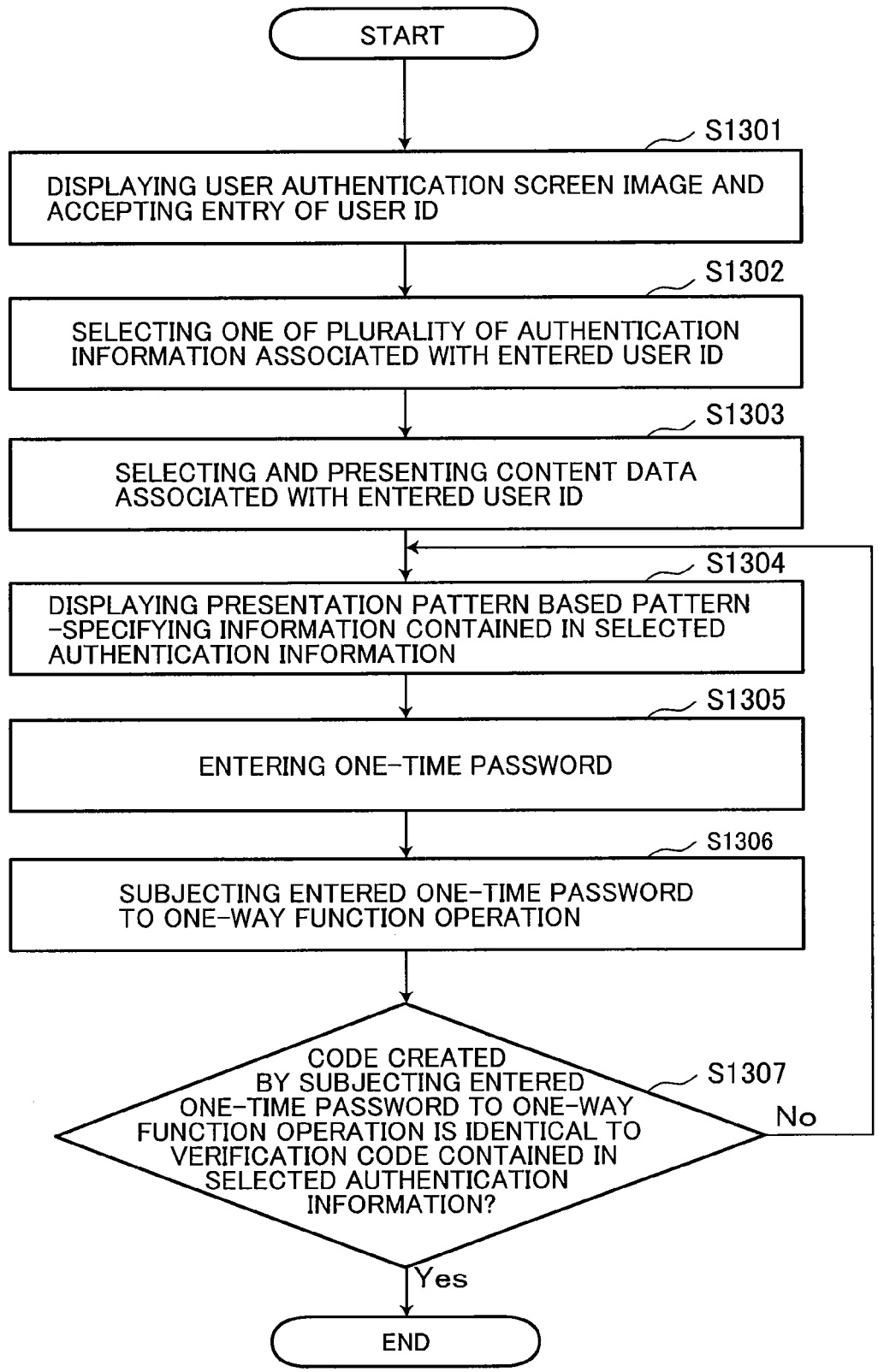
FIG. 13 is a flowchart showing a content presentation-type user authentication stage in the content presentation-type authentication in the first embodiment.

FIG. 13 is a flowchart showing a content presentation-type authentication stage. Firstly, the user-ID input unit 324 of the client 120 accepts an entry of a user ID from a user (S1301). In the first embodiment, a Windows logon authentication screen image A 1400 is displayed on a display unit to prompt the user to enter his/her user ID, and the user enters the user ID into a user name field on the logon authentication screen image A. In logon to Windows domain network, a name of a domain network as a logon destination is entered into a logon destination field.

Then, the authentication-information selector 332 of the client 120 selectively reads one of the plurality of authentication information stored in the authentication-information storage 331 in a manner associated with the entered user ID, in accordance with a given rule (S1302). In the first embodiment, in a period before newly acquiring content-added authentication information from the authentication-service providing server 110, after one of the plurality of stored authentication information is selected and used for one of the plurality of user authentications, the already selected authentication information will not be selected for any one of the remaining user authentications. In this case, a different presentation pattern can be displayed for each of the user authentications, so that a brute force attack can be precluded to further enhance security. For example, in cases where the number of the stored authentication information is 100, the user authentication can be successively performed 100 times in a period before acquiring new authentication information. When the number of non-selected ones of the authentication information gets fewer, an alarm indicating the fact is displayed. When all of the plurality of authentication information are selected, new user authentication cannot be performed any more.

Concurrently, the content selector 336 selectively reads a given number of content data from the plurality of content data stored in the authentication-information storage 331 in a manner associated with the entered user ID, in accordance with a given rule, and the content presentation unit 337 forcibly presents one or more contents to the user based on the given number of selected content data (S1303). Typically, the given rule for selecting the content data is to select the content data in order of memory address of the authentication-information storage 331. In the first embodiment, in a period before acquiring and storing new content-added authentication information from the authentication-service providing server 110, after one or more of the plurality of content data is selected for one of the plurality of user authentications, the already selected content data will not be selected for any one of the remaining user authentications. Further, the content selector 336 is operable to select the content data in such a manner that, when all of the plurality of stored authentication information are selected, all of the plurality of stored content data are selected. For example, the content data is contained in the content-added authentication information three times the number of the authentication information, and the content selector 336 is operable to select three of the plurality of content data for each of the plurality of user authentications. In this case, it is guaranteed that all of the plurality of content data transmitted from the authentication-service providing server 110 are forcibly presented to the user in a reliable manner, which makes it easy to figure out the number of actual presentations of each content. Thus, in cases where the content is an advertisement, an advertisement fee can be clearly calculated. Typically, after entering the user ID of the user into the user name field in the Windows logon authentication screen image A 1400 to request for the user authentication and before displaying a logon authentication screen image B 1402 including a presentation pattern 1403, each of the three contents is displayed on a content presentation screen image 1401 for 5 seconds. In this process, the user is looking at the display unit for the user authentication, so that it becomes possible to make the user to reliably look at or listen to the content.

Figure 14:
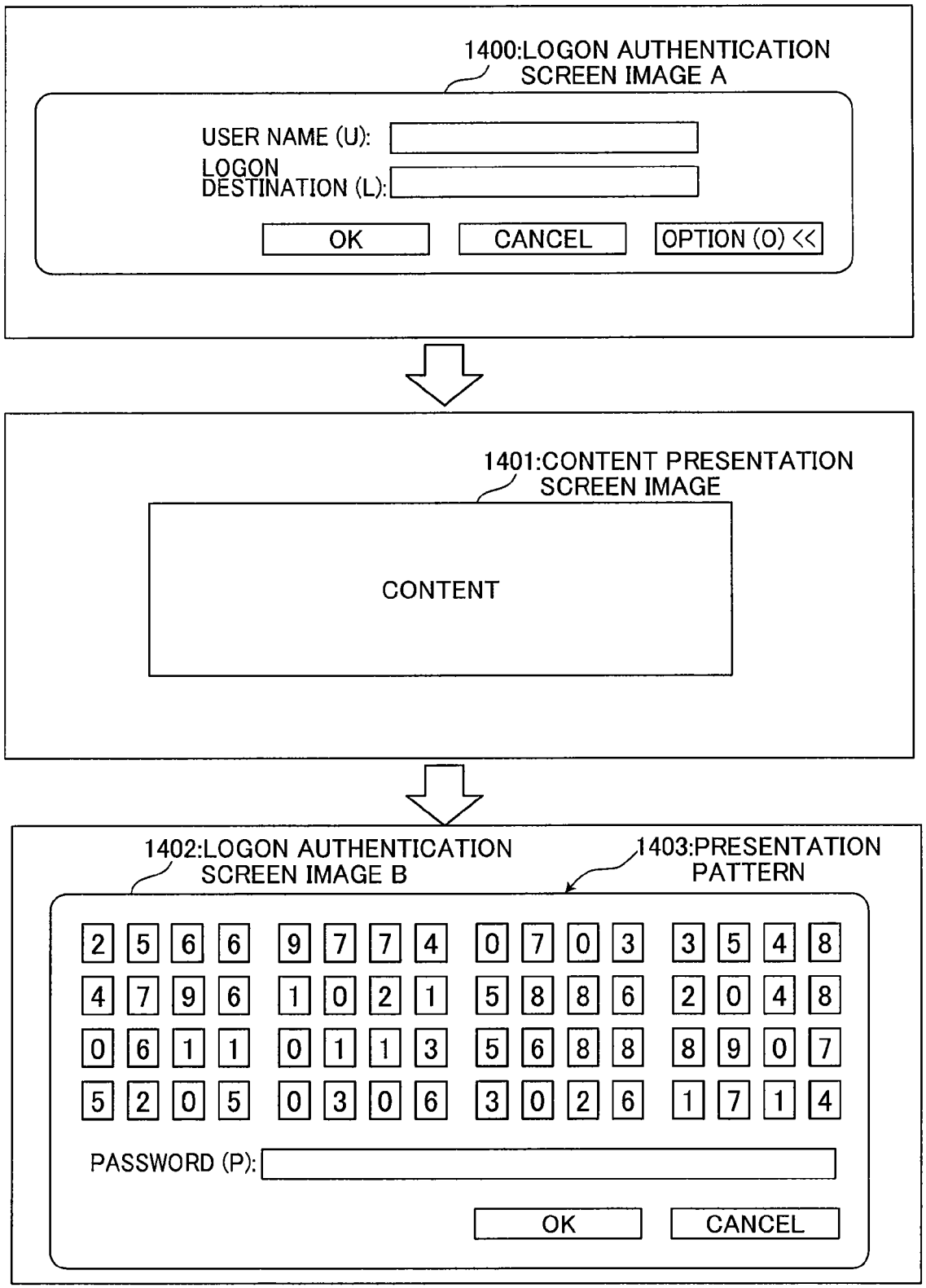
FIG. 14 is a schematic diagram showing a Windows (trademark) logon authentication screen image in the client in the first embodiment.

Then, the pattern-element-sequence creator 333 of the client 120 creates a pattern element sequence based on the pattern-specifying information contained in the selected authentication information, and the pattern display unit 334 creates an image of a presentation pattern 1403 in which a plurality of pattern elements included in the created pattern element sequence are arranged at respective positions in a patter format consisting of four 4×4 matrixes, and displays the created image (S1304). The presentation pattern can be specified based on the pattern-specifying information and in accordance with the given rule described in connection with the verification-code creator 305. Typically, as shown in FIG. 14, following the content presentation screen image 1401, the logon authentication screen image B 1402 including the presentation pattern 1403 is displayed on the display screen of the client 120. In cases where the pattern-specification information is a pattern element sequence itself, the pattern-element-sequence creator 333 reads the pattern element sequence from the selected authentication information, and directly output the read pattern element sequence to the pattern display unit 334.

Then, the user who intends to be authenticated enters a one-time password as a result of selecting certain ones of the pattern elements displayed at specific positions in the presentation pattern displayed on the display screen of the client 120, in a given order, i.e., applying the user's one-time-password derivation rule to the presentation pattern 1403, through the one-time-password input unit 335 (S1305). Then, the user authentication unit 338 of the client 120 compares a code created by subjecting the one-time password entered through the one-time-password input unit 335 to the one-way function operation (S1306), with the verification code contained in the selected authentication information (S1307), and, when they are identical to each other, successfully authenticates the user. If the two codes are not identical, a presentation pattern may be re-displayed based on the pattern-specifying information to prompt the user to re-enter a one-time password (S1304, S1305). The presentation pattern to be re-displayed may be created based on a newly selected pattern-specifying information or may be created by reusing the previous pattern-specifying information. Further, the routine may return to S1301 to prompt the user to re-enter the user ID. The one-way function operation to be used for a one-time password in the client is identical to the one-way function operation used for creating the verification code contained in the authentication information in the authentication-service providing server.

The content may be presented at a given position of each of the logon authentication screen image A 1400 and the logon authentication screen image B 1402 while displaying each of the screen images, or may be presented after success of the logon authentication. After success of the logon authentication, a computer operation is precluded for a certain time due to a process, such as computer boot process. Thus, during this period, the content can be forcibly presented to the user without imposing a burden on the user. In cases where the content is a music, it may be continuously output during the logon authentication process.

Based on presenting a content in connection with the user authentication, a user operating a client for the user authentication certainly looks at or listens to the content. In addition, a content to be presented is appropriately specified on a user-by-user basis in accordance with the content-presentation target user condition, so that a user can look at or listen to a content which arouses his/her interest. In cases where the content is an advertisement, it is guaranteed that the advertisement is looked at or listened to by appropriate users, so that advertising effects can be enhanced.

[Content-Added Authentication Information Re-Acquisition Stage]

Preferably, each of the plurality of authentication information contained in the content-added authentication information is used only once, and the used authentication information is not used again. Because a brute force attack can be precluded to provide higher security by using different authentication information to display a different presentation pattern, for each of the plurality of user authentications. Thus, in a scheme where used authentication information is not used again, when all of or a given number of the plurality of authentication information contained in the content-added authentication information acquired by the client 120 are used, the client 120 re-acquires new content-added authentication information to obtain a plurality of new authentication information. Further, if a certain time elapses after acquiring content-added authentication information, contents contained in the content-added authentication information is likely to become eroded. In this case, it is also preferable to re-acquire new content-added authentication information.

Figure 15:
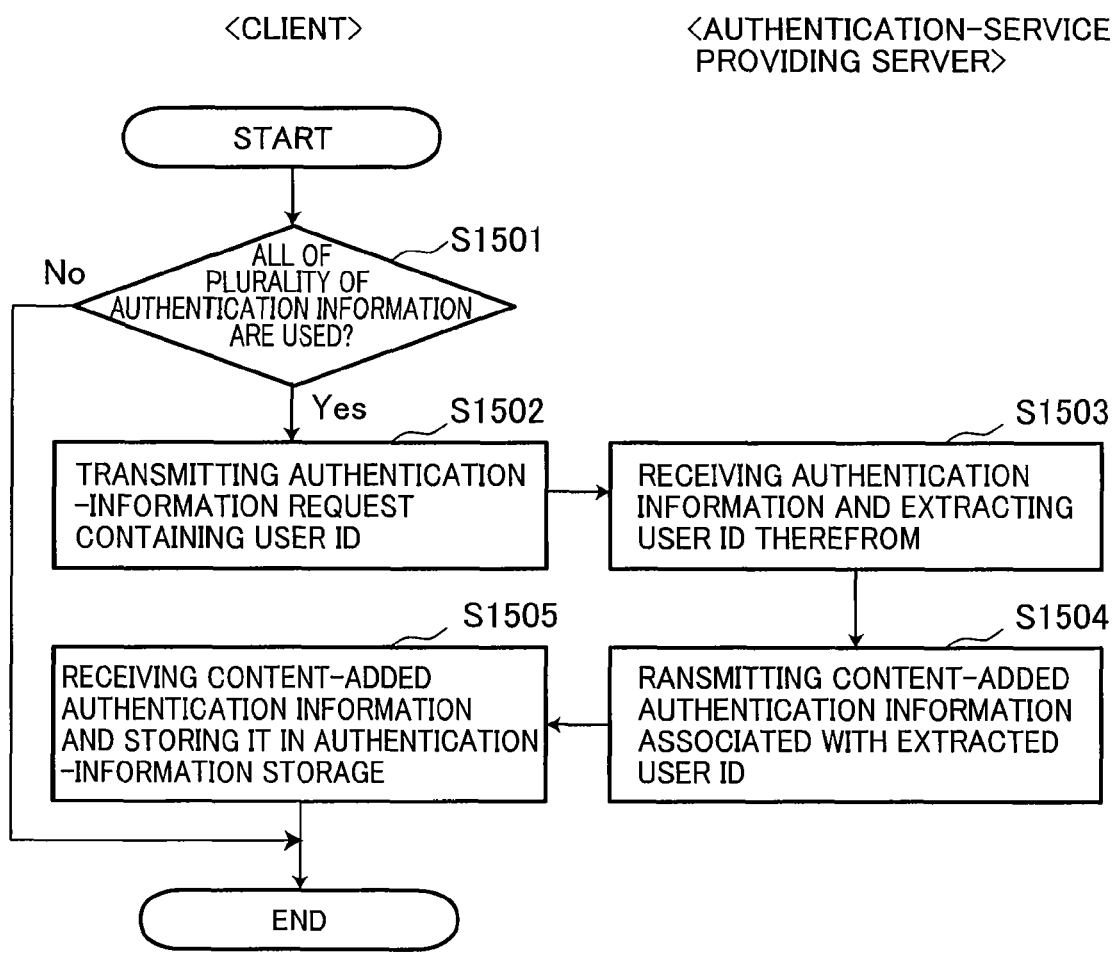
FIG. 15 is a flowchart showing a content-added-authentication-information re-acquisition stage in the content presentation-type authentication in the first embodiment.

FIG. 15 is a flowchart showing a content-added authentication information re-acquisition stage. After success of the user authentication, the client 120 determines whether all of the plurality of authentication information stored in the authentication-information storage 331 of the client 120 in a manner associated with the authenticated user ID are selected for the authentications of the user ID (S1501).

When all of the plurality of authentication information are used, the authentication-information-request transmitter 325 of the client 120 re-transmit the request for authentication information pertaining to the user ID (S1502). In the first embodiment, the authentication-information-request transmitter 325 accesses the Web page provided by the authentication-service providing server 110 to allow for acquisition of the authentication information, and displays an screen image for prompting the user to re-acquire new content-added authentication information, on the display unit of the client 120. According to the screen image, the user accesses the Web page for allow for acquisition of the authentication information, and enters the his/her user ID on the Web page to request for the authentication information.

The authentication-service providing server 110 receives the authentication-information request, and extracts the user ID contained in the received authentication-information request, through the authentication-information-request receiver 311 (S1503). Then, the authentication-information transmitter 312 reads the content-added authentication information associated with the extracted user ID, from the authentication-information storage 310, and transmits it to the client 120 via the network (S1504). Preferably, the plurality of authentication information contained in the re-transmitted content-added authentication information are different from the plurality of previously-transmitted authentication information. Based on using the plurality of different authentication information as described above, a different presentation patterns can be displayed, so that it becomes possible to preclude a brute force attack so as to further enhance security.

Then, the client 120 receives the re-transmitted content-added authentication information through the authentication-information receiver 330, and stores it in the authentication-information storage 331 in a manner associated with the user ID of the user to update the previous content-added authentication information therewith (S1505). The above content-added authentication information re-acquisition stage may be performed at a timing different from that as described above, such as a timing before start of the user authentication.

[Information Update Stage]

The content presentation-type authentication system may comprise the unit to update information stored in the user-information storage 307, the content-information storage 308 and the authentication-information storage 310 in the authentication-service providing server 110, at a given timing. For example, user-information updater is operable to update age of the user information after an elapse of one year or more from the registration date thereof stored in the user-information storage 307, depending elapsed years from the registration date, once per year. A content-information updater is operable to delete the content stored in the content-information storage 308 when a certain period elapses from the registration data thereof. An authentication-information updater is operable to activate the pattern-specifying-information generator 304 at a given timing to create new content-added authentication information based on updated information in the user-information storage 307 and the content-information storage 308, and store the newly created content-added authentication information in the authentication-information storage 310. Typically, the given timing is a timing after an elapse of a certain time, a timing at which a new user is registered, or a timing at which the user information or the content information is updated by a corresponding one of the user-information updater and the content-information updater. Alternatively, the given timing may be a timing at which information stored in the user-information storage 307, the password storage 306 and the content-information storage 308 is updated.

[Content Presentation-Type Authentication System According to Second Embodiment]

Figure 16:
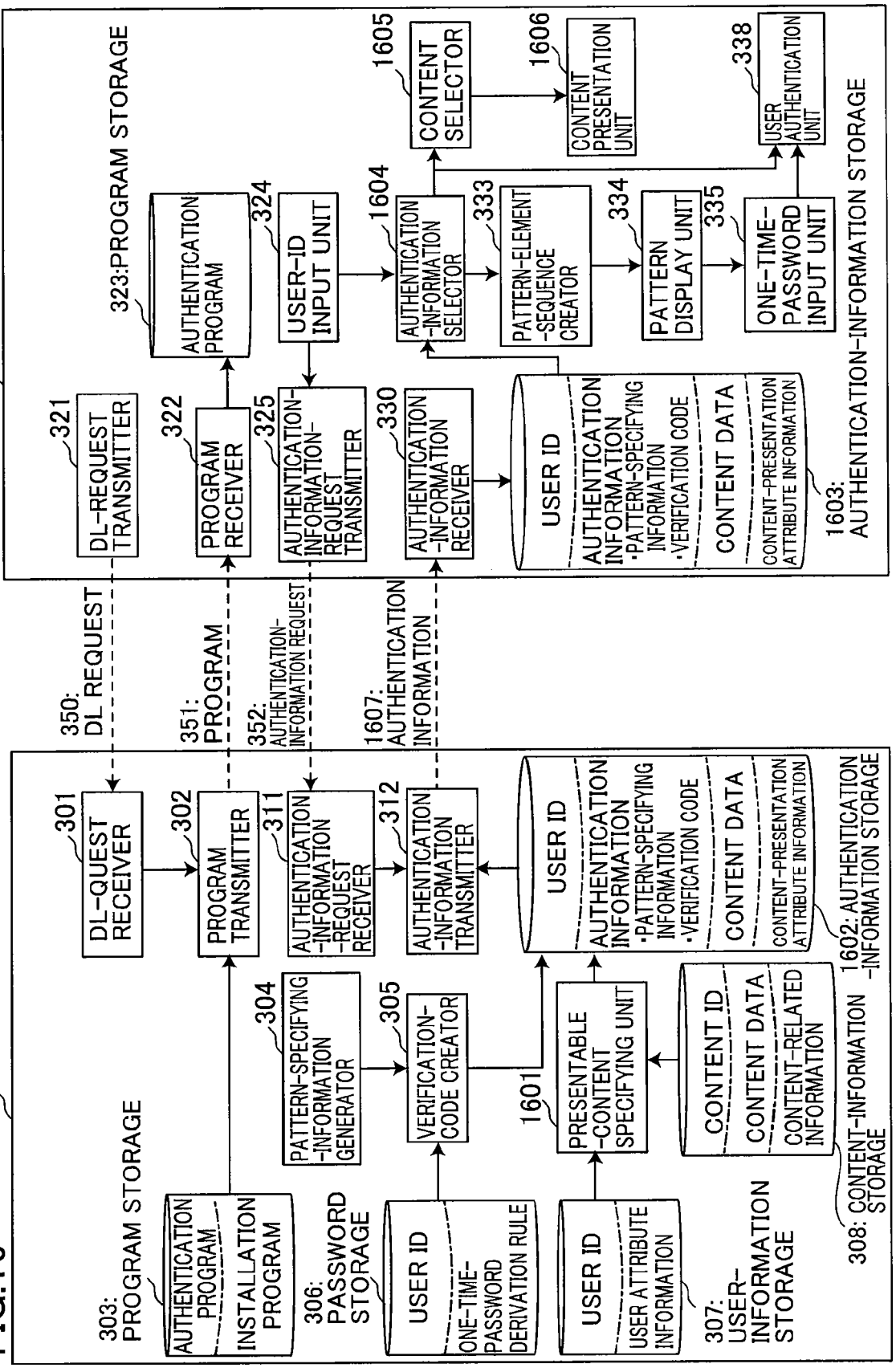
FIG. 16 is a block diagram showing respective functional configurations of an authentication-service providing server and a client in a content presentation-type authentication system according to a second embodiment of the present invention.

A content presentation-type authentication system according to a second embodiment of the present invention will be described below mainly with a focus on a difference from the content presentation-type authentication system according to the first embodiment. In the following description, the same element and step as those in the first embodiment is defined by the common reference numeral or code. FIG. 16 is a block diagram showing respective functional configurations of an authentication-service providing server 110 and a client 120 in the second embodiment to be achieved by running a user-authentication support application on a CPU 200 of the authentication-service providing server 110 while running a content presentation-type user authentication program on a CPU 253 of the client 120, based on the hardware configurations of the authentication-service providing server 110 and the client 120 illustrated in FIG. 2.

The following description will be made about function blocks different from those of the first embodiment. A presentable-content specifying unit 1601 of the authentication-service providing server 110 is a functional block achievable by cooperation between hardware, such as a CPU 200 and a RAM 201, and software, such as a user-authentication support application, in the authentication-service providing server 110, and operable, based on user attribute information and content-related information, to specify a plurality of content IDs of respective contents to be forcibly presented to each of a plurality of users and a plurality of content-presentation attribute information pertains to respective ones of the content IDs, with respect to a given number of the contents to be used in each of a plurality of user authentications, and output them to an authentication-information storage 1602. The authentication-information storage 1602 is a functional block achievable by cooperation between hardware, such as the CPU 200, the RAM 201, a program storage subunit 206 and an information storage subunit 207, and software, such as the user-authentication support application, in the authentication-service providing server 110, and operable to store therein a user ID of each of the users, authentication information for the user ID, content data and content-presentation attribute information, in a mutually associated manner, wherein the content data and the content-presentation attribute information are directly associated with the authentication information. The authentication-information storage 1602 may be configured to store content-added authentication information in a nonvolatile memory, such as a hard disk, or may be configured to store the content-added authentication information in a volatile memory, such as a RAM.

An authentication-information storage 1603 is a functional block achievable by cooperation between hardware, such as a RAM 252, a CPU 253 and an information storage subunit 256, and software, such as an authentication program, in the client 120. The authentication-information storage 1603 is operable to store therein the content-added authentication information 1607 received by an authentication-information receiver 330. The authentication-information storage 1603 may be configured to store the content-added authentication information in a nonvolatile memory, such as a hard disk, or may be configured to store the content-added authentication information in a volatile memory, such as a RAM. Authentication-information selector 1604 is an functional block achievable by cooperation between hardware, such as the RAM 252 and the CPU 253, and software, such as the authentication program, in the client 120, and operable to selectively read one of a plurality of content-added-authentication-information packages for the user ID output received from a user-ID input unit 324, and output the authentication information containing in the selected content-added-authentication-information package to each of a pattern-element-sequence creator 333 and a user authentication unit 338 while outputting the selected content-added-authentication-information package to content selector 1605. The content selector 1605 is an functional block achievable by cooperation between hardware, such as the RAM 252 and the CPU 253, and software, such as the authentication program, in the client 120, and operable to extract the content data and the content-presentation attribute information contained in the content-added-authentication-information package received from the authentication-information selector 1604 to select a plurality of the content data associated with the selected authentication information, and output them to a content presentation unit 1606. The content presentation unit 1606 is a functional block achievable by cooperation between hardware, such as an external/network interface 250, a user interface 251, the RAM 252 and the CPU 253, and software, such as the authentication program, in the client 120, and operable to forcibly present contents to the user, based on the content data and the associated content-presentation attribute information received from the content selector 1605.

An operation of the content presentation-type authentication system according to the second embodiment will be described below. In the second embodiment, in addition to the content-presentation target user condition in the first embodiment, content-related information associated with each of the content IDs contains a desired presentation condition associated with the content ID. The desired presentation condition includes a desired presentation frequency representing a desired number of presentations of the content per user authentication; a desired presentation duration representing a desired time-period of presentation of the content per user authentication; and continuous-presentation permissibility information representing whether continuous presentation of the content is permissible. Thus, in a content registration stage (FIG. 8), the desired presentation condition additionally contained in the content-related information is transmitted from a content offering server 140 to the authentication-service providing server 110 (S805), and stored in content-information storage of the authentication-service providing server 110 in a manner associated with the content ID (S807).

FIG. 17 is a flowchart showing a content-added-authentication-information creation stage in the second embodiment. The following description will be made about steps different from those in the first embodiment. Then, with respect to each of the user IDs, the presentable-content specifying unit 1601 specifies a plurality of the content IDs on condition that user attribute information associated with the user ID satisfies the content-presentation target user condition contained in the content-related information associated with each of the plurality of content IDs (S1005). Then, the content IDs specified with respect to each of the user IDs are arranged in order of presentation to the user, in accordance with a given rule (S1700). Then, a set of a plurality of the content IDs to be presented for each of the plurality of user authentication is grouped as a first content package, and a plurality of groups of the content IDs associated with the user ID are temporarily stored in the RAM 201 as a first presentable content table (S1701). Typically, the specified content IDs are randomly arranged. Alternatively, for example, a presentation priority may be contained in the content-related information in the authentication-service providing server 110 to allow the specified content IDs to be arranged in descending order of the presentation priority. In the second embodiment, the number of contents to be presented for each of the user authentications is set to three. Thus, three content IDs are contained in each of the plurality of content packages. Typically, the first presentable content table is stored in a manner illustrated in FIG. 18(A).

Further, the presentable-content specifying unit 1601 rearranges the content IDs in the first presentable content table to satisfy the desired presentation condition contained in the content-related information associated with each of the content IDs, and creates content-presentation attribute information representing a presentation mode of each of the contents, in accordance with the desired presentation condition contained in the content-related information associated with each of the content IDs. Then, the plurality of content IDs of respective contents to be presented for each of the user authentications and the plurality of content-presentation attribute information for respective ones of the contents are grouped as a second content package, and the plurality of second content packages are associated with the user ID and temporarily stored in the RAM 201 as a second presentable content table. Typically, the second presentable content table is stored in the form of a table illustrated in FIG. 18(B) (S1702).

For example, in FIG. 18(A), after randomly arranging the content IDs specified with respect to a user ID=U000, the arranged content IDs are grouped into a plurality of first content packages (1) to (R) each consisting of three content IDs, in order of memory address, so as to form a first presentable content table. The first content package (1) in the first presentable content table contains three content IDs=C000 to C002. This example will be more specifically described on an assumption that the desired presentation condition for the content ID=C000 comprises "desired presentation frequency"="2", "desired presentation duration"="5 seconds" and "continuous-presentation permissibility information"="impermissible", and the desired presentation condition for the content ID=C001 comprises "desired presentation frequency"="1", "desired presentation duration"="5 seconds" and "continuous-presentation permissibility information"="impermissible". In this case, the content ID=C000 is assigned to the first presentation memory area 1801 and the third presentation memory area 1803 of the second content package (1) in the second presentable content table, and content-presentation attribute information representing "presentation duration" "5 seconds" and "continuous presentation"="NO" is created and associated with each of the assigned content IDs=C000. Further, the content ID=C001 is assigned to the second presentation memory area 1802 of the second content package (1), and content-presentation attribute information representing "presentation duration"="5 seconds" and "continuous presentation"="NO" is associated with the assigned content ID=C001. The content ID=C002 is assigned to the second content package (2) because no memory area remains for the content ID=C002 in the second content package (1). The above operation is performed with respect to all of the first content packages (1) to (R) to create a second presentable content table comprising a plurality of second content packages (1) to (S). Meanwhile, when the "continuous presentation"="YES", continuous content data can be represented by the same content data. For example, in cases where the same content date is continuously presented three times, each of the number of content data and the number of content-presentation attribute information to be contained in one content package becomes one, as in the second content package (S) in FIG. 18(B).

Then, with respect to each of the user IDs, the authentication-information storage 1602 reads the second content packages in the second presentable content table in order one-by-one, and replaces the content IDs in each of the second content packages with the plurality of content data associated with the content IDs. Further, the authentication-information storage 1602 stores therein the plurality of content data in a manner associated with each of the plurality of authentication information, as content-added authentication information (S1703). The content-added authentication information contains a plurality of content-added authentication information packages. Each of the content-added authentication information packages contains one of the plurality of authentication information, the plurality of contents data associated with the authentication information, and the plurality of content-presentation attribute information associated with respective ones of the plurality of contents data. The authentication information contains pattern-specifying information and a verification code obtained based on the pattern-specifying information. Typically, the content-added authentication information is stored in a manner illustrated in FIG. 19. In the content-added authentication information in the first embodiment, although each of the plurality of authentication information is associated with a respective one of the plurality of content data through the user ID, the authentication information is not directly associated with the content data. Differently, in the second embodiment, the content data corresponding to the content ID is stored in a manner directly associated with one of the plurality of authentication information. The content data and the content-presentation attribute information may be associated with the authentication information individually. Alternatively, the plurality of content data and the plurality of associated content-presentation attribute information may be grouped, and then associated with the authentication information on a group-by-group basis. Then, in the client 120, one of the plurality of authentication information for use in one of the plurality of user authentications is selected, and then the content data associated with the selected authentication information is presented to the user. As above, the content data is directly associated with the authentication information, so that the selection of the content data to be presented to the user can be facilitated, which makes it possible to effectively utilize a computation resource of the client 120. Further, as with the first embodiment, in the authentication-information storage 1602, the content-added authentication information may be preliminarily stored therein, or may be created in response to an authentication-information request and temporarily stored therein until being transmitted.

Then, in a content-added-authentication-information acquisition stage, in response to receiving an authentication-information request containing a user ID from the client 120 (S1202), the authentication-service providing server 110 transmits, to the client 120, the content-added authentication information containing the plurality of authentication information, the plurality of content data and the plurality of content-presentation attribute information each associated with the user ID contained in the received authentication-information request (S1203). The client 120 receives the transmitted content-added authentication information, and stores it in the authentication-information selector 1603 (S1204).

Figure 20:
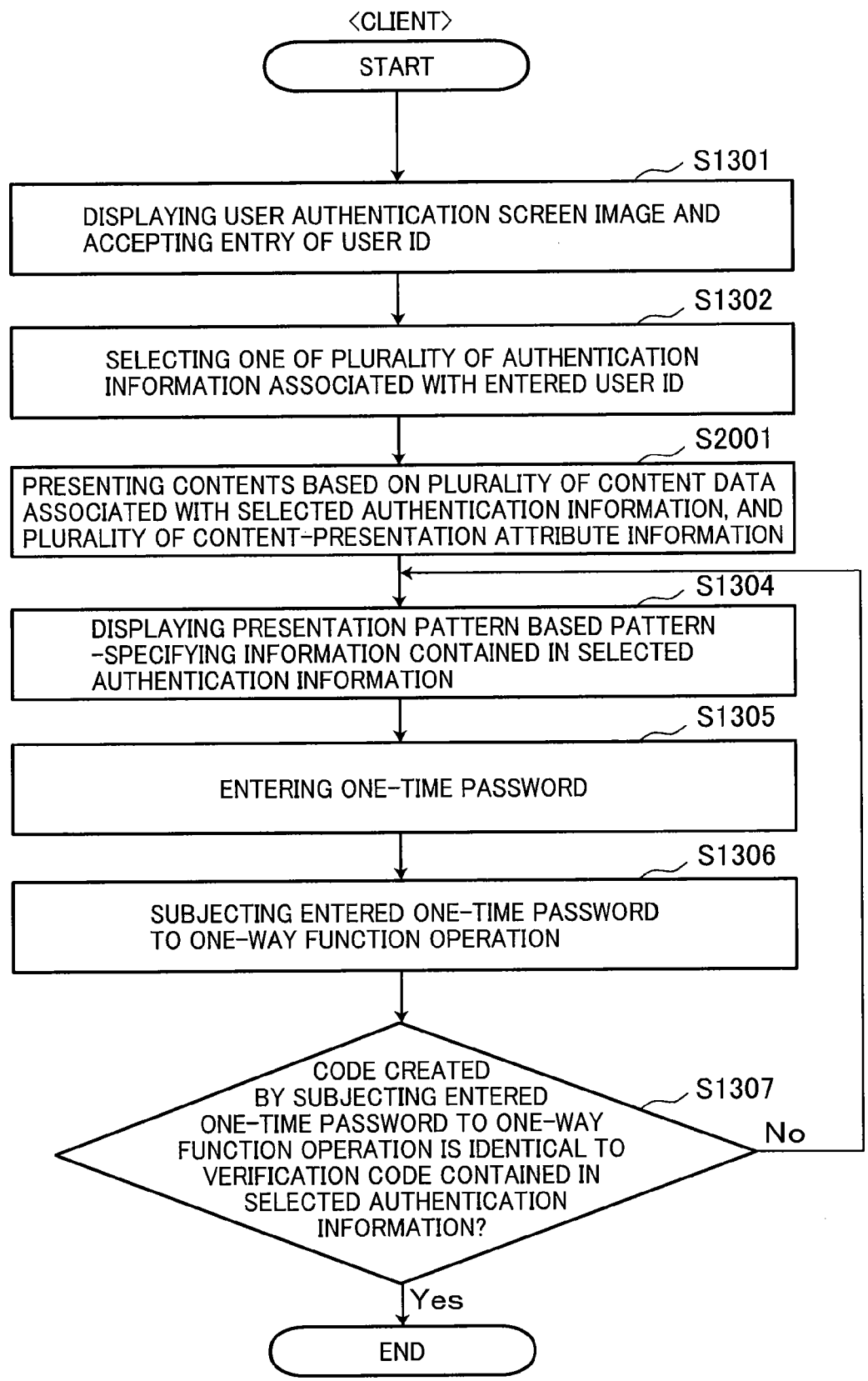
FIG. 20 is a flowchart showing a content presentation-type user authentication stage in the content presentation-type authentication in the second embodiment.
Figure 21:
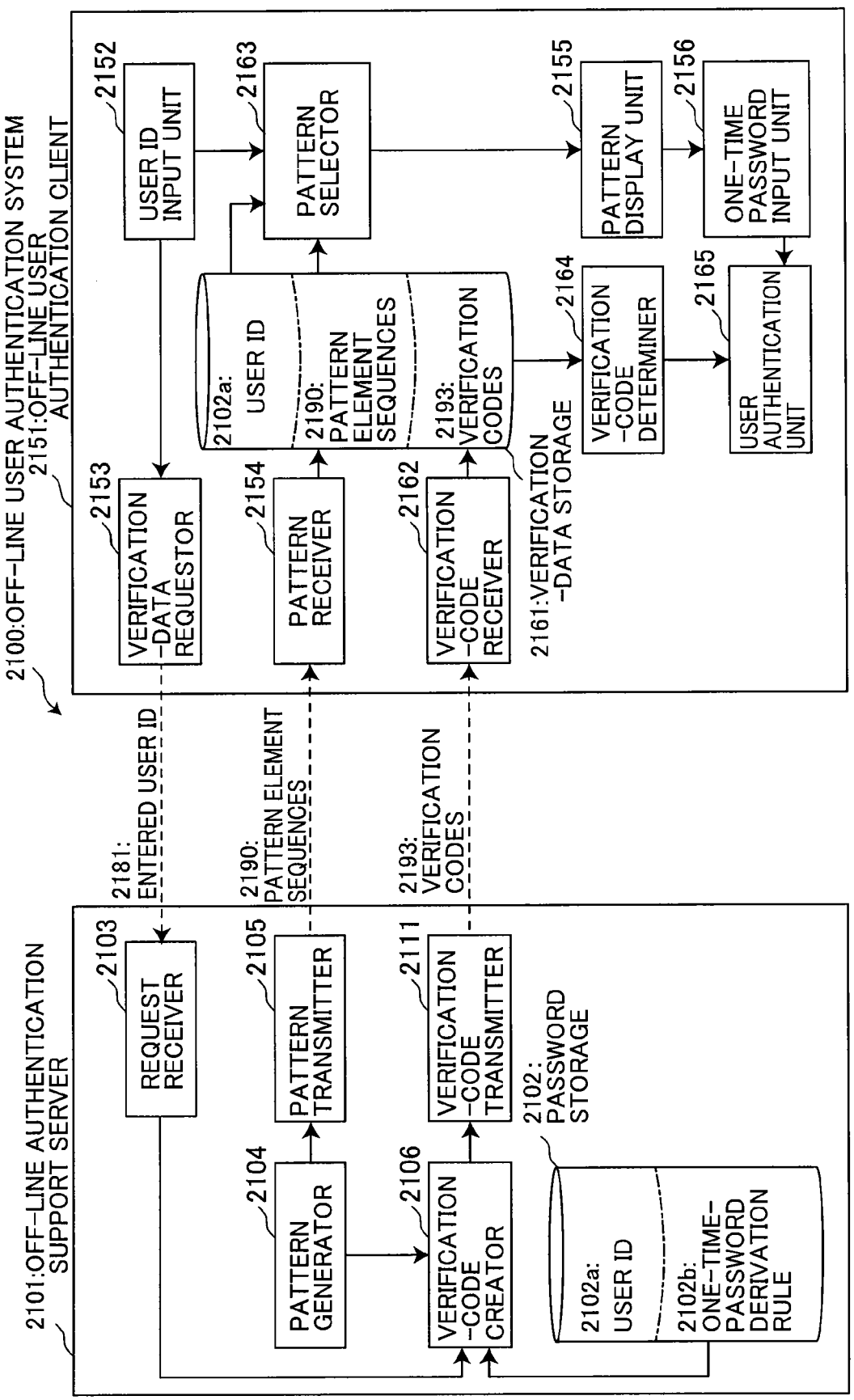
FIG. 21 is a functional block diagram showing a conventional user authentication system based on a matrix authentication scheme.

FIG. 20 is a flowchart showing a content presentation-type authentication stage in the second embodiment. As with the first embodiment, in response to receiving an entry of a user ID of a user who intends to be authenticated (S1301), the client selects one of the plurality of authentication information associated with the entered user ID, in accordance with a given rule (S1302). In the second embodiment, the authentication-information selector 1604 selectively reads one of the plurality of content-added authentication information packages to select the authentication information contained in the read content-added authentication information package. Typically, the given rule for selecting one of the plurality of authentication information is to select the authentication information in order of memory address. The content selector 1605 extracts the plurality of content data and the plurality of associated content-presentation attribute information each contained in the content-added authentication information package received from the authentication-information selector 1604 to select contents associated with the selected authentication information, and delivers the plurality of selected content data and the plurality of content-presentation attribute information to the content presentation unit 1606. The authentication-information selector 1604 and the content selector 1605 may be configured to operate as an integral function block. Based on the plurality of delivered content data, the content presentation unit 1606 forcibly presents contents (S2001). Further, the content presentation unit 1606 determines a presentation duration of each of the contents and whether the content is continuously presented, according to the content-presentation attribute information associated with each of the plurality of content data. For example, when "content presentation duration"="5 second" and "continuous presentation"="YES (two times)", after presenting the content for 5 seconds, the content is presented for 5 seconds again. As above, based on the content-added authentication information package, contents will be presented in a given presentation mode in connection with the user authentication.

The above embodiments have been described for illustrative purposes, but the present invention is not limited to the embodiments. It is obvious to those skilled in the art that various changes and modifications may be made therein without departing from the spirit and scope thereof as set forth in appended claims.

What is claimed is:

1. A content presentation-type authentication system to allow a client to perform a content presentation-type user authentication in which a content is unilaterally presented to a user, who is a subject of authentication, during user authentication which is performed with a one-time password derivation rule applied as a password by the user to pattern elements presented in a presentation pattern to the user to derive therefrom a one-time password which includes elements located at specific positions in the presentation pattern, the content presentation-type authentication system comprising an authentication-service providing server and a client, (A) the authentication-service providing server being configured to manage (i) user IDs of the users and passwords of the users, (ii) content data describing respective contents to be unilaterally presented during the user authentication, and (iii) content IDs of the contents, and to provide content-added authentication information to the users, wherein the authentication-service providing server comprises:

a user-information storage which stores therein the user IDs in relation to user attribute information indicative of attributes of the users;

a password storage which stores therein the user IDs in relation to the one-time-password derivation rules;

a pattern-specifying-information generator operable to generate, in accordance with a given generation rule, plural sets of pattern-specifying information adapted to specify the presentation patterns;

a verification-code creator operable to create a verification code from the one-time password subjected to a one-way function operation;

a content-information storage which stores therein, in relation to the respective content, (i) the content ID, (ii) the content data, and (iii) content-related information containing content-presentation target user conditions for use in identifying a user to be presented with the content;

a presentable-content specifying unit operable to specify the content ID of a content whose content-presentation target user conditions meet the user attribute information of a particular user;

an authentication-information storage which stores therein, in relation to the respective user ID, (i) the plural sets of authentication information containing the verification codes and the pattern-specifying information used to create the verification codes, and (ii) plural sets of content data for contents specified to meet the user attributes of the user;

an authentication-information-request receiver operable to receive, from the client via a network, an authentication-information request containing the user ID of a user who intends to be authenticated; and a content-added-authentication-information transmitter operable to transmit to the client the content-added authentication information containing the plural sets of authentication information and the plural sets of content data stored in relation to the received user ID, (B) the client being equipped with a content presentation-type user authentication program and a processor operable to execute the program to implement the content presentation-type user authentication, wherein the content presentation-type user authentication program is executed by the processor to achieve:
- a user-ID input unit operable to accept an entry of the user ID from the user;
- an authentication-information-request transmitter operable to transmit the authentication-information request containing the entered user ID to the authentication-service providing server via the network;
- a content-added-authentication-information receiver operable to receive, via the network, the content-added authentication information stored for the entered user ID in and transmitted from the authentication-service providing server;
- an authentication-information storage which stores therein the received content-added authentication information;
- an authentication-information selector operable to select one set of authentication information contained in the received content-added authentication information;
- a pattern-element-sequence creator operable to create a pattern element sequence, based on the pattern-specifying information contained in the selected set of authentication information;
- a pattern display unit operable to create a presentation pattern, based on the created pattern element sequence, and display the created presentation pattern on a screen;
- a one-time-password input unit operable to accept a one-time password from the user who applied the one-time-password derivation rule to pattern elements displayed in the presentation pattern;
- a user authentication unit operable to compare the entered one-time password subjected to the one-way function operation, with the verification code contained in the selected set of authentication information, and, when they are identical to each other, to successfully authenticate the user;
- a content selector operable to select, in accordance with a given rule, a set of content data of a content to be unilaterally presented during the user authentication, from the plural sets of content data contained in the received content-added authentication information; and
- a content presentation unit operable to present the content of the selected set of content data to the user during the user authentication.

2. The content presentation-type authentication system as defined in claim 1, wherein the content presentation-type user authentication program is installed on the client to implement the content presentation-type authentication in place of user authentication implemented by an OS's built-in authentication program originally installed on the client, and further wherein an installation program is executed by the processor of the client to install the content presentation-type user authentication program onto the client, so as to change settings of an OS of the client to start the content presentation-type user authentication program in place of the OS's built-in authentication program.

3. The content presentation-type authentication system as defined in claim 2, wherein the content presentation-type user authentication program is downloaded from the authentication-service providing server to the client, and further wherein:
- the authentication-service providing server further comprises (i) a program storage which stores therein the content presentation-type user authentication program and the installation program, (ii) a download-request receiver operable to receive, from the client via the network, a download request for the content presentation-type user authentication program and the installation program, and (iii) a program transmitter responsive to the download request to transmit the content presentation-type user authentication program and the installation program to the client via the network; and
- the client comprises (i) a download-request transmitter operable to transmit the download request for the content presentation-type user authentication program and the installation program to the authentication-service providing server via the network, (ii) a program receiver operable to receive the content presentation-type user authentication program and the installation program from the authentication-service providing server, and (iii) a program storage operable to store therein the received programs.

4. The content presentation-type authentication system as defined in claim 1, wherein the content is an advertisement.

5. The content presentation-type authentication system as defined in claim 1, wherein:
- the content-information storage of the authentication-service providing server further to stores therein the plural sets of content data with respect to a respective user ID in relation to one of the plural sets of authentication information which is stored in relation to the user ID; and
- the content selector of the client is operable to select a set of content data which is associated with a set of authentication information selected to authenticate the user, and to present the content of the selected content data during the user authentication.

6. The content presentation-type authentication system as defined in claim 1, wherein the content-related information contains, for a content associated with the content-related information, a desired presentation condition which comprises at least one of (i) a desired number of times of presenting the associated content during the user authentication, (ii) a desired duration of running a presentation of the associated content during the user authentication and (iii) continuous-presentation permissibility information indicating whether a continuous presentation of the associated content is permissible,
and further wherein:
- the presentable-content specifying unit is operable to produce, based on the desired presentation condition, content-presentation attribute information including at least one of (i) a presentation duration of the associated content and (ii) continuous presentation information indicating whether the associated content is continuously presented, and store the content-presentation attribute information in the authentication-information storage in relation to the content date of the associated content;
- the content-added authentication information to be transmitted from the authentication-service providing server to the client further comprises the content-presentation attribute information; and
- the content presentation unit is operable to unilaterally represent the associated content to the user during the user authentication, according to the content-presentation attribute information.

7. The content presentation-type authentication system as defined in claim 1, wherein the authentication-information storage of the client is adapted to avoid re-selecting an already selected one of the plural sets of authentication information contained in the content-added authentication information stored for a particular user in the authentication-information storage of the client, and further wherein:

when the plural sets of authentication information for the particular user have all been selected, the authentication-information-request transmitter of the client transmits a new authentication-information request containing the user ID of the particular user via the network;

the authentication-information-request receiver of the authentication-service providing server receives the new authentication-information request from the client via the network;

the content-added-authentication-information transmitter of the authentication-service providing server transmits new content-added authentication information for the particular user to the client;

the content-added-authentication-information receiver of the client receives, via the network, the new content-added authentication information transmitted from the authentication-service providing server; and the authentication-information storage of the client updates the stored content-added authentication information for the particular user with the received content-added authentication information.

8. The content presentation-type authentication system as defined in claim 1, wherein the authentication-service providing server further comprises at least one of (i) a user-information updater operable to update information stored in the user-information storage, (ii) an authentication-information updater operable to update information stored in the authentication-information storage and (iii) a content updater operable to update information stored in the content-information storage.

9. The content presentation-type authentication system as defined in claim 1, wherein:

the presentable-content specifying unit of the authentication-service providing server is adapted, to re-specify for a respective user ID a plurality of content IDs of contents whose content-presentation target user conditions meet the user attribute information for the user ID; and the authentication-information storage is updated with the contents of the re-specified content IDs.

10. The content presentation-type authentication system as defined in claim 1, wherein the pattern-element-sequence creator is operable to create the pattern element sequence based on both the pattern-specifying information and the user ID.

11. The content presentation-type authentication system as defined in claim 1, wherein the user attribute information includes at least one of an age and a gender of a respective user.

* * * * *